United States Patent
Han et al.

(10) Patent No.: US 9,792,025 B2
(45) Date of Patent: Oct. 17, 2017

(54) METHOD AND DEVICE FOR EXECUTING OBJECT ON DISPLAY

(71) Applicant: SAMSUNG ELECTRONICS CO., LTD., Suwon-si (KR)

(72) Inventors: Se-hee Han, Seoul (KR); Jun-hyung Kim, Yongin-si (KR); Jack Lee, Seongnam-si (KR); Joo-yeol Lee, Seongnam-si (KR); Ji-hye Lee, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/493,784

(22) Filed: Apr. 21, 2017

(65) Prior Publication Data

US 2017/0228140 A1    Aug. 10, 2017

Related U.S. Application Data

(63) Continuation of application No. 15/270,293, filed on Sep. 20, 2016, which is a continuation of application No. 15/255,542, filed on Sep. 2, 2016, now Pat. No. 9,632,682, which is a continuation of application No. 14/821,990, filed on Aug. 10, 2015, now Pat. No. 9,436,370, which is a continuation of application No.
(Continued)

(30) Foreign Application Priority Data

Apr. 6, 2012  (KR) .................. 10-2012-0036245

(51) Int. Cl.
G06F 3/0481    (2013.01)
G06F 3/0484    (2013.01)
G06F 3/0488    (2013.01)

(52) U.S. Cl.
CPC ........ *G06F 3/04845* (2013.01); *G06F 3/0488* (2013.01); *G06F 3/04847* (2013.01); *G06F 3/04883* (2013.01)

(58) Field of Classification Search
CPC .... G06F 3/0488; G06F 3/0484; G06F 3/0481; G06F 3/04883
USPC ....................................... 715/765
See application file for complete search history.

(56) References Cited

U.S. PATENT DOCUMENTS 6,091,411 A    7/2000   Straub et al.
6,501,487 B1   12/2002  Taguchi
(Continued)

FOREIGN PATENT DOCUMENTS

EP    1026572 A2    8/2000
EP    2386938 A2    11/2011
(Continued)

OTHER PUBLICATIONS

Communication dated Feb. 6, 2017, issued by the Japanese Intellectual Property Office in counterpart Japanese Application No. 2013-079341.
(Continued)

*Primary Examiner* — Andrea Leggett
(74) *Attorney, Agent, or Firm* — Sughrue Mion, PLLC

(57) ABSTRACT

A method and device for executing an object on a display. The method of executing an object includes receiving a user input to an object displayed on a display; gradually enlarging and displaying the object; and executing the application corresponding to the object as the object is enlarged.

28 Claims, 20 Drawing Sheets

Related U.S. Application Data

13/646,233, filed on Oct. 5, 2012, now Pat. No. 9,146,655.

(56) References Cited

U.S. PATENT DOCUMENTS

| | | | |
|---|---|---|---|
| 7,200,808 B1 | 4/2007 | Nagao | |
| 8,031,184 B2 | 10/2011 | Kim | |
| 8,384,816 B2 | 2/2013 | Minamino | |
| 8,648,838 B2 | 2/2014 | Miyazawa et al. | |
| 2009/0267907 A1* | 10/2009 | Noma | G06F 3/0481 345/173 |
| 2010/0011299 A1 | 1/2010 | Brodersen et al. | |
| 2010/0031203 A1 | 2/2010 | Morris et al. | |
| 2010/0114974 A1 | 5/2010 | Jung et al. | |
| 2010/0169834 A1 | 7/2010 | Wakizaka et al. | |
| 2011/0050653 A1 | 3/2011 | Miyazawa et al. | |
| 2011/0138325 A1 | 6/2011 | Yang | |
| 2011/0279388 A1* | 11/2011 | Jung | G06F 3/04883 345/173 |
| 2011/0296351 A1* | 12/2011 | Ewing, Jr. | G06F 3/0346 715/841 |
| 2012/0069055 A1 | 3/2012 | Otsuki et al. | |
| 2012/0071208 A1* | 3/2012 | Lee | H04M 1/72544 455/566 |
| 2012/0284789 A1 | 11/2012 | Kim et al. | |

FOREIGN PATENT DOCUMENTS

| | | |
|---|---|---|
| EP | 2431870 A2 | 3/2012 |
| JP | 11-345233 A | 12/1999 |
| JP | 2001-069223 A | 3/2001 |
| JP | 2002-207562 A | 7/2002 |
| JP | 2006-085724 A | 3/2006 |
| JP | 2006-185195 A | 7/2006 |
| JP | 2010-217938 A | 9/2010 |
| JP | 2010-239206 A | 10/2010 |
| JP | 2011-53832 A | 3/2011 |
| JP | 2011-154613 A | 8/2011 |
| JP | 2012048279 A | 3/2012 |
| KR | 1020120029722 A | 3/2012 |
| KR | 1020120029723 A | 3/2012 |
| RU | 2421777 C2 | 6/2011 |
| TW | 200842678 A | 11/2008 |

OTHER PUBLICATIONS

Communication dated Dec. 27, 2016, from the Intellectual Property Office of Taiwan in counterpart application No. 102111794.

International Search Report (PCT/ISA/210), dated Jul. 30, 2013, issued by the International Searching Authority in counterpart International Patent Application No. PCT/KR2013/002760.

Written Opinion (PCT/ISA/237), dated Jul. 30, 2013, issued by the International Searching Authority in counterpart International Patent Application No. PCT/KR2013/002760.

Communication dated Mar. 27, 2017, in counterpart Russian Patent Application No. 2014144679.

Communication dated Jul. 21, 2017, from the European Patent Office in counterpart European Application No. 13162701.0.

* cited by examiner

METHOD AND DEVICE FOR EXECUTING OBJECT ON DISPLAY

CROSS-REFERENCE TO RELATED PATENT APPLICATION

This is a continuation application of U.S. patent application Ser. No. 15/270,293, filed Sep. 20, 2016, in the U.S. Patent and Trademark Office, which is a continuation of U.S. patent application Ser. No. 15/255,542, filed Sep. 2, 2016, in the U.S. Patent and Trademark Office, which is a continuation application of U.S. patent application Ser. No. 14/821,990, filed on Aug. 10, 2015, in the U.S. Patent and Trademark Office, now U.S. Pat. No. 9,436,370 issued Sep. 6, 2016, which is a continuation application of U.S. patent application Ser. No. 13/646,233, filed on Oct. 5, 2012, in the U.S. Patent and Trademark Office, now U.S. Pat. No. 9,146,655 issued Sep. 29, 2015, which claims priority from Korean Patent Application No. 10-2012-00036245, filed on Apr. 6, 2012, in the Korean Intellectual Property Office, the disclosures of which are incorporated herein by reference in their entireties.

BACKGROUND

1. Field

The exemplary embodiments relate to a method and device for executing an object on a display according to a user input.

2. Description of the Related Art

A device is classified into a mobile/portable device and a stationary device according to whether the device is moveable. In detail, the mobile/portable device is classified into a handheld device and a vehicle mount device according to whether a user carries the device.

Along with diversified functions of these device, multimedia players have been developed to have multi-functions, for example, a still or video image photographing function, a music or video file reproducing function, a game function, a broadcast receiving function, and so on. In order to support these functions of these devices, the improvement of the devices in terms of the structure and software can be considered.

Recently, in order to obtain simple design of a device and to provide a convenient user interface (UI) to a user, technologies related to a touch input, such as a touch screen, a touch pad, or the like have been applied to devices. Accordingly, various attempts have been tried to realize more convenient UI environments by using these touch input technologies.

SUMMARY

The exemplary embodiments provide a method and device for executing an object on a display, which execute an operation about the object in one mode of a plurality of execution modes related to the object according to a user input to the object on a display The exemplary embodiments also provide a method and device for executing an object on a display, which execute application corresponding to the object according to a user input for enlarging the object on the display.

According to an aspect of an exemplary embodiment, there is provided a method of executing application, the method including receiving a user input to an object displayed on a display; gradually enlarging and displaying the object; and executing the application corresponding to the object as the object is enlarged.

The method may further include displaying an executing result of the application corresponding to the object on an enlarged region of the object.

The method may further include checking a size of the enlarged object, wherein the displaying of the executing result of the application may include displaying the executing result of the application corresponding to the object on the enlarged region of the object when the size of the enlarged object is equal to or greater than a first threshold value.

The displaying of the executing result of the application may include gradually enlarging and displaying the executing result of the application as the object is enlarged.

The displaying of the executing result of the application may include displaying a portion of an execution image of the application, and displaying a remaining portion of the execution image of the application as the object is enlarged.

The displaying of the executing result of the application may include displaying summary information about the executing result of the application when a size of the enlarge object is equal to or greater than the first threshold value and is equal to or smaller than a second threshold value.

The displaying of the executing result of the application may include displaying detailed information about the executing result of the application when the size of the enlarge object is equal to or greater than the second threshold value.

The method may further include generating vibration of a predetermined pattern as the executing result of the application is displayed.

The application may be application for reproducing a video, and the displaying of the executing result of the application may include displaying a preview image of the video on the enlarged region of the object when a size of the enlarge object is equal to or greater than a first threshold value.

The displaying of the executing result of the application may include displaying a reproduced image of the video on the enlarged region of the object when the size of the enlarge object is equal to or greater than the first threshold value and is equal to or smaller than a second threshold value.

The application may be calendar application, and the displaying of the executing result of the application may include changing and displaying at least one calendar image from among a day unit image, a week unit image, and a month unit image on the enlarged region of the object according to a size of the enlarged object.

The application may be application for reproducing a music, and the method may further include outputting a prelisten sound of the music when a size of the enlarged object is equal to or greater than a first threshold value.

The displaying of the executing result of the application may include displaying summary information about the music when the size of the enlarged object is equal to or greater than the first threshold value.

The method may further include outputting a reproduced sound of the music when the size of the enlarged object is equal to or greater than a second threshold value.

The displaying of the executing result of the application may include displaying a control image for controlling reproduction of the music on the enlarged region of the object when the size of the enlarged object is equal to or greater than the second threshold value.

The user input may be performed by touching and dragging the object.

The method may further include reducing the enlarged object to an original size before the touching is performed, as the touching is dropped within a predetermined period of time after the dragging is performed.

The method may further include reducing the enlarged object to an original size before the touching is performed, as the object is flicked in an opposite direction to a direction in which the object is enlarged after the dragging is performed.

The method may further include fixing a size of the enlarged object as the touching is held for a predetermined period of time after the dragging is performed.

The method may further include detecting a pressure applied to the display due to the touching; and fixing a size of the enlarged object as a pressure that is equal to or greater than a predetermined intensity is applied to the display due to the touching after the dragging is performed.

According to another aspect of an exemplary embodiment, there is provided a portable terminal device including a memory for storing at least one program; and a processor for executing an object on a display by executing the at least program, wherein the at least one program may include commands for executing operations for receiving a user input to an object displayed on a display; gradually enlarging and displaying the object; and executing application corresponding to the object as the object is enlarged The at least one program may include commands for executing an operation for displaying an executing result of the application corresponding to the object on an enlarged region of the object.

The at least one program may include commands for executing an operation for checking a size of the enlarged object, wherein the displaying of the executing result of the application may include displaying the executing result of the application corresponding to the object on the enlarged region of the object when the size of the enlarged object is equal to or greater than a first threshold value.

The displaying of the executing result of the application may include gradually enlarging and displaying the executing result of the application as the object is enlarged.

The displaying of the executing result of the application may include displaying a portion of an execution image of the application, and displaying a remaining portion of the execution image of the application as the object is enlarged.

The displaying of the executing result of the application may include displaying summary information about the executing result of the application when the size of the enlarge object is equal to or greater than the first threshold value and is equal to or smaller than a second threshold value.

The displaying of the executing result of the application may include displaying detailed information about the executing result of the application when the size of the enlarge object is equal to or greater than the second threshold value.

The at least one program may include commands for executing an operation for generating vibration of a predetermined pattern as the executing result of the application is displayed.

The application may be application for reproducing a video, and the displaying of the executing result of the application may include displaying a preview image of the video on the enlarged region of the object when the size of the enlarge object is equal to or greater than the first threshold value.

The displaying of the executing result of the application may include displaying a reproduced image of the video on the enlarged region of the object when the size of the enlarge object is equal to or greater than the first threshold value and is equal to or smaller than a second threshold value.

The application may be calendar application, and the displaying of the executing result of the application may include changing and displaying at least one calendar image from among a day unit image, a week unit image, and a month unit image on the enlarged region of the object according to the size of the enlarged object.

The application may be application for reproducing a music, and the method may further include outputting a prelisten sound of the music when the size of the enlarged object is equal to or greater than the first threshold value.

The displaying of the executing result of the application may include displaying summary information about the music when the size of the enlarged object is equal to or greater than the first threshold value.

The at least one program may include commands for executing an operation for outputting a reproduced sound of the music when the size of the enlarged object is equal to or greater than a second threshold value.

The displaying of the executing result of the application may include displaying a control image for controlling reproduction of the music on the enlarged region of the object when the size of the enlarged object is equal to or greater than the second threshold value.

The user input may be performed by touching and dragging the object.

The at least one program may include commands for executing an operation for reducing the enlarged object to an original size before the touching is performed as the touching is dropped within a predetermined period of time after the dragging is performed.

The at least one program may include commands for executing an operation for reducing the enlarged object to an original size before the touching is performed as the object is flicked in an opposite direction to a direction in which the object is enlarged after the dragging is performed.

The at least one program may include commands for executing an operation for fixing a size of the enlarged object as the touching is held for a predetermined period of time after the dragging is performed.

The at least one program may include commands for executing an operation for detecting a pressure applied to the display due to the touching; and fixing a size of the enlarged object as a pressure that is equal to or greater than a predetermined intensity is applied to the display due to the touching after the dragging is performed.

BRIEF DESCRIPTION OF THE DRAWINGS

The above and other features and advantages of the exemplary embodiments will become more apparent by describing in detail exemplary embodiments thereof with reference to the attached drawings in which.

DETAILED DESCRIPTION

Figure 1:
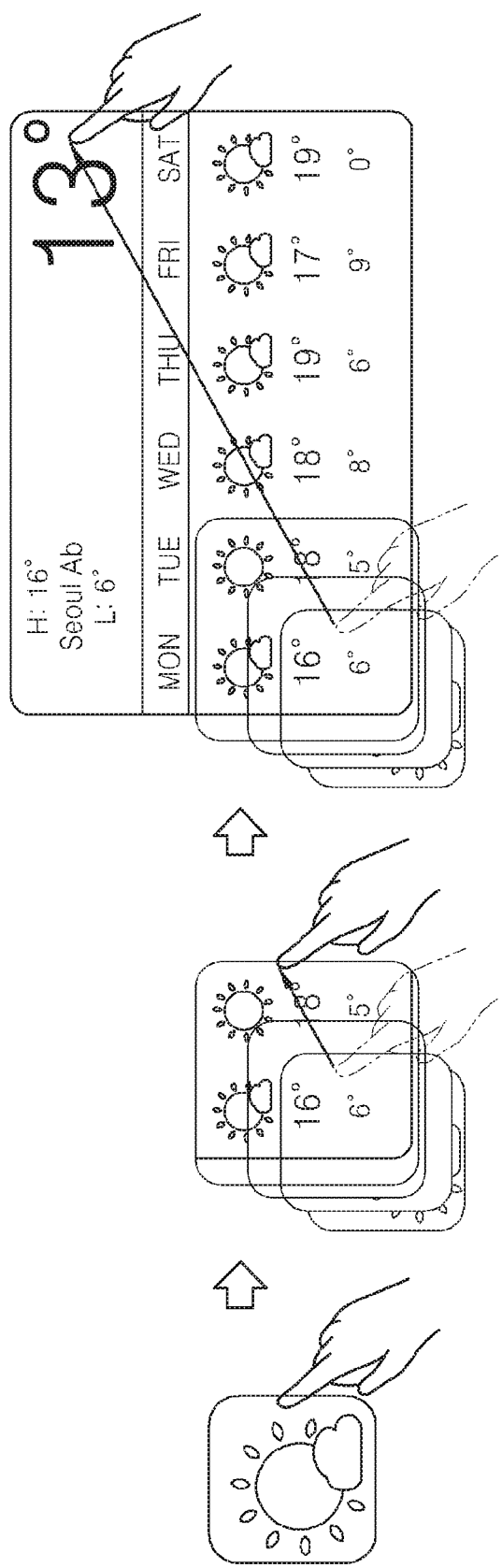
FIG. 1 is a diagram of a case where an object is executed on a display of a device by using a method of executing an object, according to an exemplary embodiment.

Exemplary embodiments are described in detail so as for those of ordinary skill in the art to easily implement with reference to the accompanying drawings. However, the exemplary embodiments may be implemented in various different forms and is not limited to these exemplary embodiments. To clearly describe the exemplary embodiments, a part without concerning to the description is omitted in the drawings, and like reference numerals in the specification denote like elements.

In the specification, when it is described that a certain part is "connected" to another part, it should be understood that the certain part may be directly connected to another part or electrically connected to another part via another part in the middle. In addition, when a certain part "includes" a certain component, this indicates that the part may further include another component instead of excluding another component unless there is no different disclosure.

In the specification, the term 'device' may be, but is not limited to, a smart phone, a portable phone, a personal digital assistant (PDA), a laptop, a media player, a global positioning system (GPS) device, or other mobile or non-mobile computing device. In addition, the device may include various devices for receiving a touch input, such as an electronic bulletin board, a touch table, or the like.

In this specification, the term 'object' refers to an object that may be selected by a user input. The object includes an image, a text, and a video, and for example, an icon, an index item, link information, a reproduced image of contents, and so on.

In this specification, the term 'tap' refers to a motion that a user very quickly touches a screen with a finger or a stylus. That is, in this case, a time difference between a touch-in time when the screen is touched by the finger or the stylus and a touch-out time when the finger or the stylus is took off the screen is very short and is equal to or less than a critical time.

The term 'touch & hold' refers to a motion that a user touches a screen with a finger or a stylus and then maintains a touch input for a critical time or more. That is, in this case, a time difference between the touch-in time and the touch-out time is equal to or greater than a critical time. In order to allow the user to recognize whether the touch input is the tap or the touch & hold, if the touch input is maintained for the critical time or more, a feedback signal may be visually or aurally provided.

The term 'double tap' refers to a motion that a user quickly touches a screen twice with a finger or a stylus.

The term 'drag' refers to a motion that a user sets a finger or a stylus on a screen and then moves it across the screen.

The term 'flick' refers to a motion that a user very quickly drag with a finger or a stylus. The drag and the flick may be distinguished whether a moving speed of the finger or the stylus is equal to or greater than a critical speed.

The term 'pinch' refers to a motion that a user touches a screen with a plurality of fingers or styluses and then an interval between the fingers or the styluses is widened or narrowed. A motion that the user touches the screen with two or more fingers and then widens an interval between the fingers or the styluses is referred to as unpinching. A motion that the user narrows the interval is referred to as pinching. As an example of the pinch, a page zooms-in according to an unpinching input and zooms-out according to a pinching input.

In this specification, an execution mode may include, for example, a first execution mode, a second execution mode, and a third execution mode.

The first execution mode may be a mode in which an operation for managing an object on a display is executed. In addition, in the first execution mode, a selection list for selecting at least one operation for selecting, copying, cutting, and moving the object on the display, and a user may select one of operations indicated on the selection list to manage the object on the display.

The second execution mode may be an execution mode for executing application corresponding to the object while enlarging the object. In the second execution mode, as the object is gradually enlarged by a user input and the application corresponding to the object may be executed, the execution result of the application may be displayed on a region of the gradually enlarged object.

The third execution mode may be a mode for displaying the execution result of the application corresponding to the object on a separate window. In the third execution mode, the execution result of the application corresponding to the object may be displayed on a separate pop-up window.

The exemplary embodiments will now be described more fully with reference to the accompanying drawings, in which exemplary embodiments are shown.

FIG. 1 is a diagram of a case where an object is executed on a display of a device by using a method of executing an object, according to an exemplary embodiment.

As shown in FIG. 1, a predetermined object may be displayed on a screen of the device according to the present embodiment and the object may be selected by a user touch. The object refers to an object that may be selected by a user input. The object includes an image, a text, and a video, and for example, an icon, an index item, link information, a reproduced image of contents, and so on. For example, the object on the screen of the device may include, but is not limited to, an icon of a video file, an icon of a music file, an icon of video reproducing application, an icon of music reproducing application, weather information providing widget, and calendar widget.

According to a user input for selecting the object, one of a plurality of execution modes may be determined, and an operation of the device, which corresponds to the object, is performed according to the determined execution mode. As the object is enlarged according to a user input, the execution result of application corresponding to the object may be displayed may be gradually enlarged.

Figure 2:
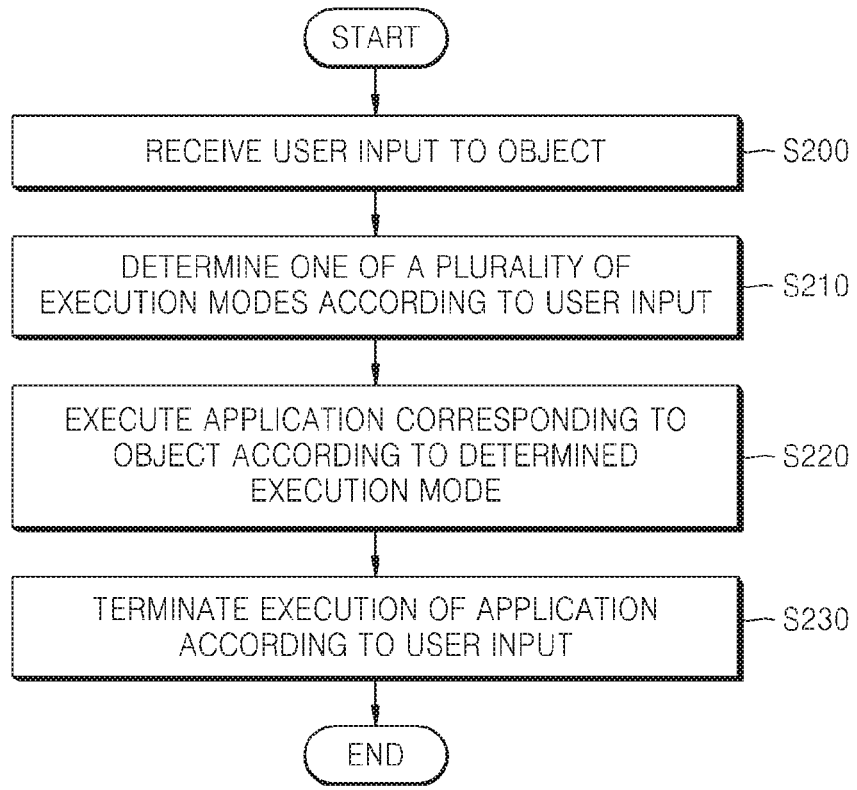
FIG. 2 is a flowchart of a method of executing an object, according to an exemplary embodiment.

FIG. 2 is a flowchart of a method of executing an object, according to an exemplary embodiment.

In operation S200, a device receives a user input to an object. In operation S200, the device may receive the user input through a touch screen. Here, a touch input may be formed by at least one gesture of touch, hold, tap, drag, flick, pinching, and unpinching. The user input is not limited to the touch input, and may include a voice input and a gesture for moving the device.

In operation S210, the device determines one from among a plurality of execution modes according to the user input. A plurality of execution modes of the device may be set so as to perform different operations with respect to an object according to the user input of the object.

The plurality of execution modes may include, but are not limited to, at least one of a first execution mode, a second execution mode, and a third execution mode.

The first execution mode may be a mode in which an operation for managing an object on a display is executed. For example, in first execution mode, at least one of selecting, copying, cutting, and moving the object may be performed.

The second execution mode may be an execution mode for executing application corresponding to the object while enlarging the object. For example, in the second execution mode, as the object is gradually enlarged by a user input and the application corresponding to the object may be executed, the execution result of the application may be displayed on a region of the gradually enlarged object.

The third execution mode may be a mode for displaying the execution result of the application corresponding to the object on a separate window. In the third execution mode, the execution result of the application corresponding to the object may be displayed on a separate pop-up window.

The first, second, and third execution modes may be matched with respective user inputs. For example, a user input performed by touching an object for a predetermined period of time or more may be matched with the first execution mode.

In addition, for example, a user input performed by touching an object for a predetermined period of time or more and then dragging the object may be matched with the second execution mode. In this case, as an edge portion of the object is touched and is dragged, application corresponding to the object may be executed according to the second execution mode. For example, a user input performed by pinching an object may be matched with the second execution mode. In addition, for example, a user input performed by touching an object a predetermined number of times within a predetermined period of time may be matched with the third execution mode. However, the exemplary embodiment is not limited thereto.

In operation S220, the device executes application corresponding to the object according to the determined execution mode. In operation S220, the device may perform an operation corresponding to the object according to the execution mode matched with a user input. For example, when the object is an execution icon of weather application, the device may execute weather application. In addition, for example, when the object is a link item for accessing a predetermined website, the device may execute an Internet browser.

In operation S230, the device terminates an operation corresponding to the object according to a user input. In operation S230, as the object is touched and dragged and then the object is dropped within a predetermined period of time, the device may terminate the operation corresponding to the object. In addition, as a user input, which is performed by touching and dragging the object and then flicking (or dragging) the object in an opposite direction to a direction in which the object is enlarged while the touch is maintained, is input, the device may terminate execution of the operation corresponding to the object. In addition, as the object terminates the operation, the device may reduce the enlarged object to an original size and may display the object.

In addition, the enlarged object may be reduced according to a predetermined user input. For example, when a user selects a window-close-icon displayed on the region of the enlarged object, the enlarged object may be reduced. Alternatively, for example, when the user touches the enlarged object for a predetermined period of time or more, moves the touched object to a predetermined region (for example, a region where a trash box icon) by dragging the object, and drops the object, the object may be restored to an original state. Alternatively, for example, when the user unpinches the enlarged object, the enlarged object may be reduced. Alternatively, for example, when a corner of the enlarged object is touched for a predetermined period of time and then is dragged or flicked in a diagonal direction, the enlarged object may be reduced. Alternatively, for example, when the user rubs the enlarged object and wallpaper together, the enlarged object may be reduced.

Figure 3:
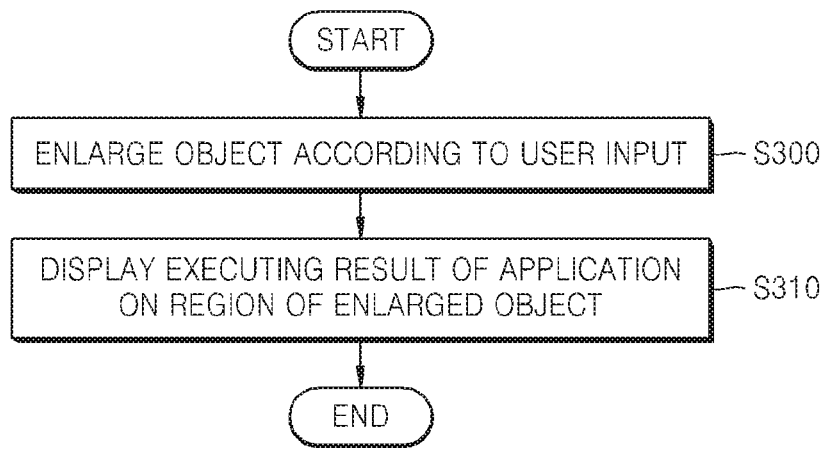
FIG. 3 is a flowchart of a method of displaying an execution result of an object according to a second execution mode, according to an exemplary embodiment.

FIG. 3 is a flowchart of a method of displaying an execution result of an object according to a second execution mode, according to an exemplary embodiment.

In operation S300, a device enlarges an object according to a user input. In operation S300, the device may enlarge the object in response to a user input performed by touching and dragging the object within a predetermined period of time. For example, as an edge portion of the object is touched and dragged, the object may be enlarged. In this case, the device may determine a degree at which the object is enlarged, based on a distance between a position at which the object is touched and a position at which the dragging is finished. Alternatively, for example, the object may be enlarged by a user input performed by pinching the object.

In addition, the device may enlarge the object based on a user input including two steps. The device may determine whether an enlarging function of the object is activated, based on a user input. After the enlarging function of the object is activated, when the device receives a user input, the device may enlarge the object.

For example, when the object is touched and held for a predetermined period of time or more, the enlarging function of the object may be activated. Alternatively, for example, when a predetermined voice is input to the device, the device may activate the enlarging function of the object. In this case, an enlarging size of the object and information displayed on the enlarged object may be previously determined and the determined information may be displayed on the region of the enlarged object having the determined size.

Alternatively, for example, when the object is multi-touched, the enlarging function of the object may be activated. Alternatively, when the object is touched and is dragged in a predetermined pattern (for example, a circle, zigzag, etc.), the device may activate the enlarging function of the object. Alternatively, when a touch pressure of the object is equal to or greater than a predetermined intensity, the device may activate the enlarging function of the object.

In addition, an effect for indicating that the enlarging function of the object is activated to the user may be displayed. For example, when the enlarging function of the object is activated, a user interface (UI) for a predetermined operation (for example, an operation for enlarging the object) may be displayed at a corner of the object. In addition, when the enlarging function of the object is activated, the object displayed on a display may shake or may be enlarged. Alternatively, when the enlarging function of the object is activated, the object may be displayed tridimensionally. For example, an edge of the object may be displayed thick or the region of the enlarged object may be displayed concave inward of the display.

In addition, as the enlarging function of the object is activated, a separate object to be enlarged according to a user input may be generated and displayed. For example, when a first icon is touched and held for a predetermined period of time or more, a second icon for executing application corresponding to the first icon may be generated and displayed. In addition, the second icon may be an icon in which the enlarging function is activated.

In addition, the device may enlarge the object according to a user input to an object of which an enlarging function is activated. For example, the device may enlarge the object according to a user input performed by a pinching input to the object of which the enlarging function is activated. When the object is touched with at least one finger and is unpinched, the object may be enlarged. Alternatively, the object may be enlarged according to a user input performed by touching and unpinching a region where the object on a display does not exist.

Alternatively, the object may be enlarged according to a user input performed by touching and dragging the object of which the enlarging function is activated. Alternatively, for example, the object may be enlarged according to a user input performed by touching a plurality of number of times the object of which the enlarging function is activated. In this case, the object may be enlarged to a predetermined size.

In addition, for example, when a separate object to be enlarged is generated and displayed, the separate object may be enlarged to a predetermined size by touching the separate object.

In operation S310, the device may display the executing result of application. In operation S310, the device may display the executing result of application on a of the enlarged object. For example, as the device enlarges the object, the device may display the executing result of application corresponding to the object on the region of the enlarged object. In this case, as the application is enlarged, the executing result of the application may be gradually enlarged and may be displayed. In addition, as the object is enlarged, some functions of the application may be performed.

For example, when the object is enlarged by touching and dragging the object, when the device starts receiving a drag input, the executing result of application may be displayed. In addition, after the drag input is received, when the object is dragged by a predetermined distance or more, the executing of the application may be displayed.

In addition, information that is displayed as the executing result of the application may be obtained from application installed in the device, but the exemplary embodiment is not limited thereto. The device may receive information about execution of application from a separate server and may display the received information. In this case, the device may be connected to the separate server and may receive information about execution of application from the connected separate server. In addition, the device may push a request for the information about execution of application to the separate server. If a networking environment is unstable, when data receipt from a server is delayed, the device may display an image that is previously captured as an executing image of application that is previously used, as the executing result of application.

A method of receiving and displaying additional information about an object from a server and content about the objet as the object is enlarged will be described in detail with reference to FIG. 9.

In addition, the device may receive information about execution of application from another device (not shown) and may display the received information. In detail, as a predetermined object displayed on the device is enlarged, the device may be pared with another device (not shown), and the device may gradually receive partial information and detailed information about content related to the object according to the size of the enlarged object. For example, when an object for searching for a file of the device is displayed on the device and is enlarged by a first threshold value or more, the device may receive and display summary information of a file stored in another device (not shown) from another device (not shown). In addition, when the object is enlarged by a second threshold value or more, the device may receive and display detailed information stored in another device (not shown) from another device (not shown).

In addition, the device may display the object together with the executing result of application on the region of the enlarged object, but the exemplary embodiment is not limited thereto.

In addition, the device may partially or entirely display the executing result of application on the region of the enlarged object according to the size of the enlarged object. In addition, the device may generate a plurality of images indicating the executing result of application and may display the plurality of images according to the respective sizes of the enlarged object.

In addition, as the executing result of application is displayed, vibration of a predetermined pattern may be generated in the device. When the executing result of application is displayed on the region of the enlarged object, the executing result of application is emphasized and displayed for a predetermined period of time. For example, when executing result of application is displayed, the enlarged object of which an edge is colored with a predetermined color blinks a plurality of number of times for a predetermined period of time. Alternatively, for example, when the executing result of application is displayed, a predetermined sound may be output from the device. Alternatively, for example, when the executing result of application is displayed, a predetermined smell may be generated. Alternatively, for example, when the executing result of application is displayed, shape of a surface of the device may be changed and a user may feel the change in the surface of the device via his or her sense of touch. In this case, the surface of the device may partially become convex or concave, but the exemplary embodiment is not limited thereto.

In addition, the device may fix the region of the enlarged object according to a user input and may display an executing result of an operation corresponding to the object on the fixed object region. For example, after the object is touched and dragged, as the touch of the object is held for a predetermined period of time or more, the device may fix the size of the enlarged object and may display the executing result of the operation corresponding to the object on the fixed region. Alternatively, for example, after the object is touched and dragged, the device may detect a pressure applied by touching a display. When the detected pressure is equal to or greater than a predetermined value, the device may fix the size of the enlarged object.

When the object is an icon for executing a predetermined content file, information contained in the executing result of application may vary according to a type of the content file.

For example, when the content file is a picture file, information about a picture image, a picture photographing time, a picture photographing place, and a picture photographing resolution may be contained in the executing result of application corresponding to the picture file.

In addition, for example, when the content file is a video file, information about an encoding method, a play time, and a video resolution may be contained in the executing result of application corresponding to the video file.

In addition, for example, when the content file is a music file, information about an encoding method and a play time, and album information may be contained in the executing result of application corresponding to the music file.

In addition, for example, when the content file is an application installation package file, a type of a platform which is subject to installation, application information, user evaluating information of application may be contained in the executing result of application corresponding to the application installation package file.

In addition, when the object is a folder icon, information about icons of files included in the folder and folder information may be contained in the executing result of application corresponding to the folder information.

As the object is enlarged, the positions and arrangements of the other objects other than the enlarged object may be adjusted on the display. The other objects other than the enlarged object may be arranged outside the region of the enlarged object on the display. However, the exemplary embodiment is not limited thereto. The enlarged object may overlap the other objects and may be displayed. In this case, the transparency of a region of the overlapped object may be adjusted such that the enlarged object may be displayed to be translucent. In addition, whether the enlarged object overlaps with the other objects or the other objects are rearranged may be determined in various ways according to the size of a screen of the display and the number of objects on the display.

A method of displaying an executing result of application as an object is enlarged will be described with reference to FIGS. 13 through 18.

Figure 4:
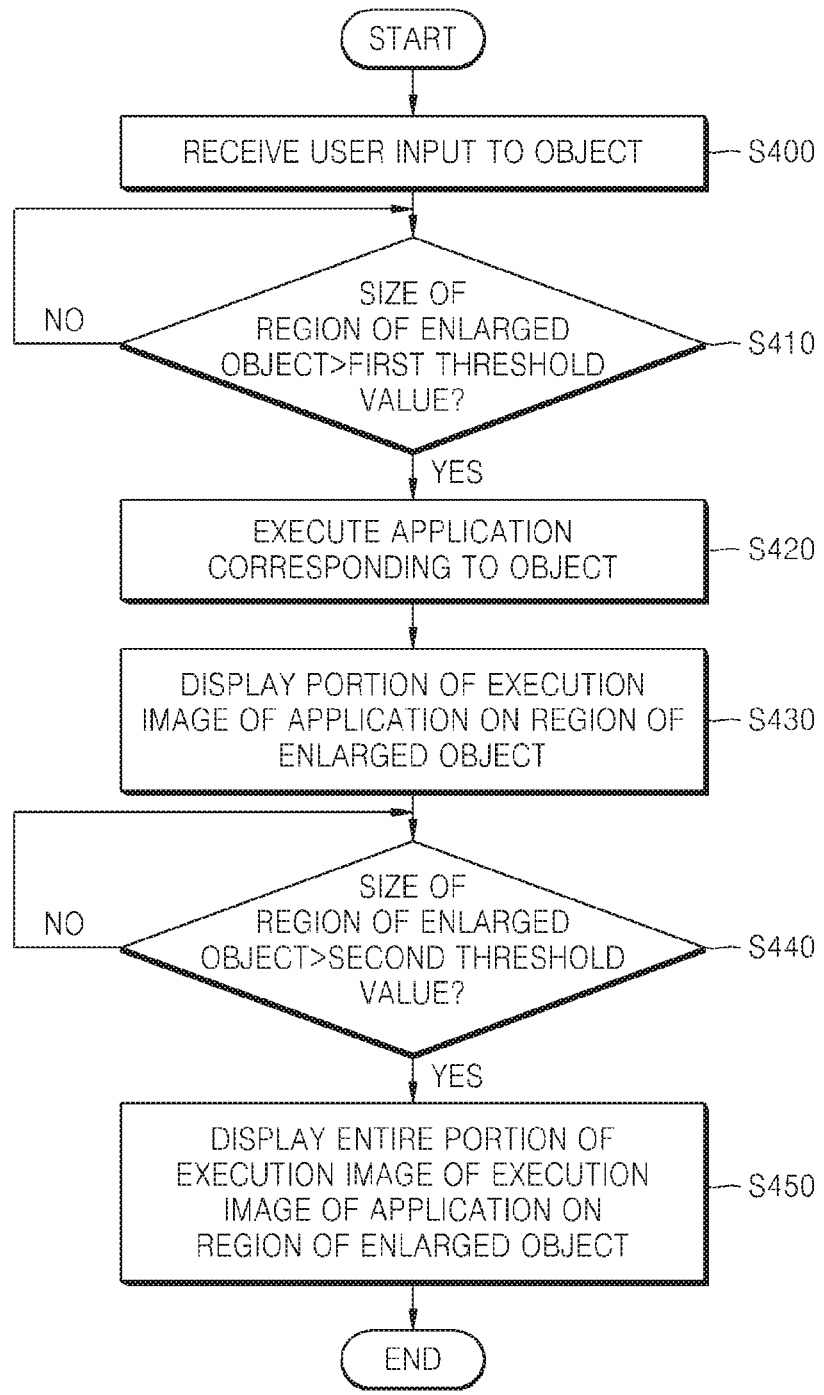
FIG. 4 is a detailed flowchart of a method of executing application corresponding to an object and displaying an execution result of the application as the object is enlarged, according to an exemplary embodiment.

FIG. 4 is a detailed flowchart of a method of executing application corresponding to an object and displaying an execution result of the application as the object is enlarged, according to an exemplary embodiment.

In operation S400, a device receives a user input to an object. In operation S400, the device may receive a user input performed by touching and dragging the object for a predetermined period of time. Alternatively, the device may receive a user input performed by touching and dragging an edge portion of the object. Alternatively, the device may receive a use input performed by pinching the object. However, a user input received by the device is not limited to these types.

In operation S410, the device may determine whether the size of the region of the enlarged object is equal to or greater than a first threshold value. In operation S410, the device may enlarge the object as the edge portion of the object is touched and dragged. In addition, the device may obtain the size of the region of the enlarged object, based on a distance between a position at which the object is touched and a position at which the dragging is finished. Alternatively, in operation S410, the device may enlarge the object as the object is pinched. In addition, the device may obtain the size of the region of the enlarged object, based on the distance between a position at which the object is touched and a position at which the dragging is finished.

In addition, the size of the region of the enlarged object may be obtained based on a distance between a position at which the object is touched and a position at which the dragging is finished. For example, the size of the region of the enlarged object may be determined based on an area of a rectangle having, as a diagonal line, a line from the position at which the object is touched and the position at which the dragging is finished. Alternatively, for example, the size of the region to the enlarged object may be determined based on an area of a circle having, as a diameter, a line from the position at which the object is touched and the position at which the dragging is finished. Alternatively, for example, the size of the region of the enlarged object may be determined based on a horizontal or vertical line of a rectangle having, as a diagonal line, a line from the position at which the object is touched and the position at which the dragging is finished.

In addition, the first threshold value may be previously set. The device may compare the obtained size with the first threshold value and may determine whether the size of the region of the enlarged object is equal to or greater than the first threshold value.

As a determining result of operation S410, when the size of the region of the enlarged object is equal to or greater than the first threshold value, in operation S420, the device executes application corresponding to the object. For example application corresponding to the object may be, but is not limited to, weather application, calculator application, news application, stock application, calendar application, video reproducing application, and music reproducing application. In addition, as the object is enlarged, only some functions of functions of application may be executed.

In operation S430, the device displays a portion of the execution image of application on the region of the enlarged object. In operation S430, the device may cut the portion of the execution image of application and may display the cut image on the region of the enlarged object. Alternatively, as the object is enlarged, the device may gradually add another portion of the execution image other than the cut portion of the execution image of application on the region of the enlarged object so as to gradually display the execution image from a portion to an entire portion on the region of the enlarge object.

In operation S440, the device determines whether the size of the region of the enlarged object is equal to or greater than a second threshold value. In operation S440, as an edge portion of the object is touched and dragged, the device may obtain the size of the region of the enlarged object, based on a distance between a position at which the device is touched and a position at which the dragging is finished. Alternatively, in operation S440, as the object is pinched, the device may obtain the size of the region of the enlarged object based on a distance between positions at which the object is touched for pinching.

In addition, the device may compare the obtained size with the second threshold value and may determine whether the size of the region of the enlarged object is equal to or greater than the second threshold value.

The second threshold value may be set according to the type of application corresponding to the object. Alternatively, the second threshold value may be set according to the number and size of components contained in an image indicating an executing result of application. However, the exemplary embodiment is not limited thereto.

As a determining result of operation S440, when the size of the region of the enlarged object is equal to or greater than the second threshold value, in operation S450, the device displays an entire portion of an execution image of application on the region of the enlarged object. Alternatively, as the object is enlarged, the device may gradually enlarge and display the execution image of the application.

In addition, when the size of the region of the enlarged object is greater than a threshold value, various types of highlight effects may be output from the device. For example, when the size of the region of the enlarged object is greater than the first threshold value by touching and dragging the object, the device may output at least one of predetermined vibration and sound. Alternatively, when the size of the region of the enlarged object is greater than the first threshold value by touching and dragging the object, at least one of color and brightness of the object may be differentiated or the object may be displayed tridimensionally. Alternatively, when the executing result of application is displayed, the device may generate a predetermined smell. Alternatively, for example, when the executing result of application is displayed, a shape of a surface of the device may be changed and a user may feel the change in the surface of the device via his or her sense of touch. In this case, the surface of the device may partially become convex or concave, but the exemplary embodiment is not limited thereto. Alternatively, when the size of the region of the enlarged object is greater than a threshold value, a highlight effect may be differentially output from the device according to a type of the threshold value.

An example of a method of displaying a portion or an entire portion of an execution image of application corresponding to an object will be described in detail with reference to FIG. 14.

Figure 5:
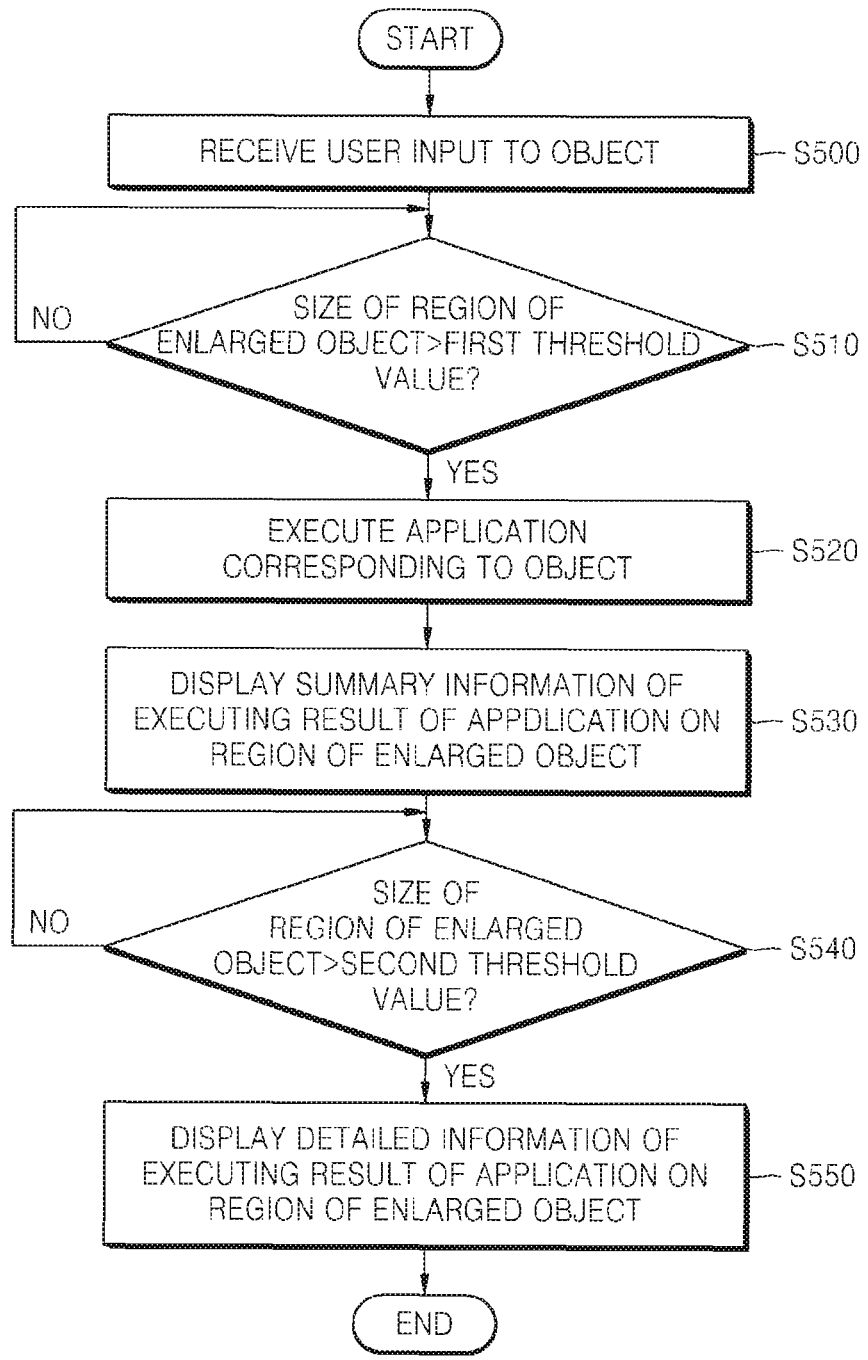
FIG. 5 is a detailed flowchart of a method of executing application corresponding to an object and displaying summary information and detailed information about an executing result of the application as the object is enlarged, according to an exemplary embodiment.

FIG. 5 is a detailed flowchart of a method of executing application corresponding to an object and displaying summary information and detailed information about an executing result of the application as the object is enlarged, according to an exemplary embodiment.

In operations S500 to S550 of FIG. 5, the object may be continually or intermittently enlarged based on a user input.

In operation S500, a device receives a user input to an object. In operation S500, the device may receive a user input performed by touching and dragging the object within a predetermined period of time. Alternatively, the device may receive a user input performed by touching and dragging an edge portion of the object. Alternatively, the device may receive a user input performed by pinching the object. However, a user input received by the device is not limited to these types.

In operation S510, the device determines whether the size of the region of the enlarged object is equal to or greater than a first threshold value. The device may obtain the size of the region of the enlarged object, may compare the obtained size with the first threshold value, and may determine whether the size of the region of the enlarged object is equal to or greater than the first threshold value.

As a determining result of operation S510, when the size of the region of the enlarged object is equal to or greater than the first threshold value, in operation S520, the device executes application corresponding to the object. Alternatively, as a determining result of operation S510, when the size of the region of the enlarged object is equal to or smaller than the first threshold value, the device may determine whether the size of the region of the enlarged object is equal to or greater than the first threshold value again. In this case, the object may be continually or intermittently displayed based on a user input.

In operation S530, the device displays the summary information of the executing result of application on the region of the enlarged object. In operation S530, the device may generate the summary information about the executing result of application and may display the generated summary information on the region of the enlarged object. In addition, the device may increase the amount of the displayed summary information as the object is enlarged.

In operation S540, the device determines whether the size of the region of the enlarged object is equal to or greater than the second threshold value. The device may obtain the size of the region of the enlarged object, may compare the obtained size with the second threshold value, and may determine whether the size of the region of the enlarged object is equal to or greater than the second threshold value.

The second threshold value may be set according to a type of application corresponding to the object. In addition, the second value may be set according to the number and size of components contained in an image indicating an executing result of application. However, the exemplary embodiment is not limited thereto.

As a determining result of operation S540, when the size of the region of the enlarged object is equal to or greater than the second threshold value, in operation S550, the device displays detailed information of the executing result of application on the region of the enlarged object. In addition, as the object is enlarged, the device may gradually enlarge and display an image containing the detailed information of the executing result of application.

In addition, as a determining result of operation S540, when the size of the region of the enlarged object is equal to or smaller than the second threshold value, the device determines whether the size of the region of the enlarged object is equal to or greater than the second threshold value again. In this case, the object may be continually or intermittently enlarged based on a user input.

An example of a method of displaying summary information and detailed information of an executing result of application corresponding to an object will be described in detail with reference to FIG. 17.

Figure 6:
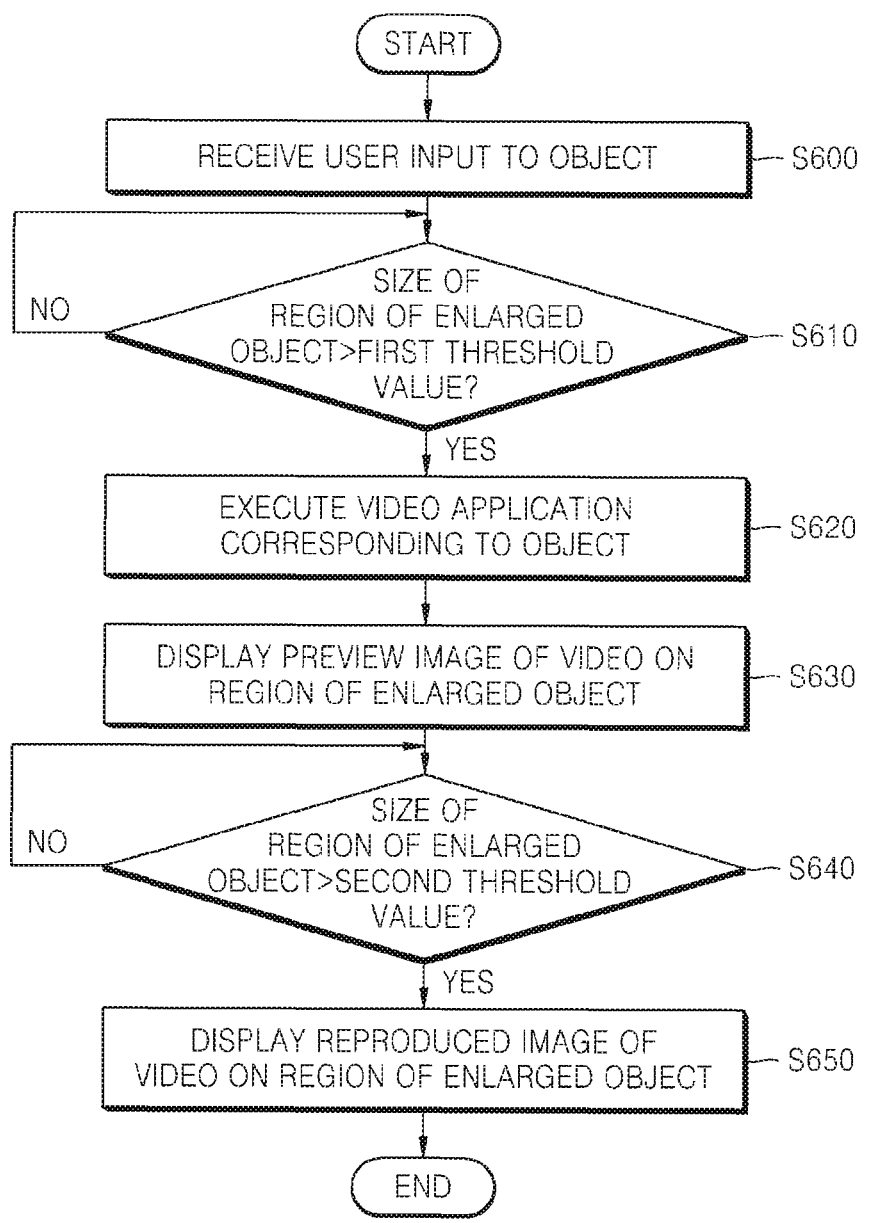
FIG. 6 is a detailed flowchart of a method of executing video application corresponding to an object and displaying an executing result of the application, according to an exemplary embodiment.

FIG. 6 is a detailed flowchart of a method of executing video application corresponding to an object and displaying an executing result of the application, according to an exemplary embodiment.

In operations S600 to S650 of FIG. 6, the object may be continually or intermittently enlarged based on a user input.

In operation S600, a device receives a user input to an object. In operation S600, the device may receive a user input performed by touching and dragging the object within a predetermined period of time. Alternatively, the device may receive a user input performed by touching and dragging an edge portion of the object. Alternatively, the device may receive a user input performed by pinching the object. However, a user input received by the device is not limited to these types.

In operation S610, the device determines whether the size of the region of the enlarged object is equal to or greater than a first threshold value. The device may obtain the size of the region of the enlarged object, may compare the obtained size with the first threshold value, and may determine whether the size of the region of the enlarged object is equal to or greater than the first threshold value. As a determining result of operation S610, when the size of the region of the enlarged object is equal to or smaller than the first threshold value, the device determines whether the size of the region of the enlarged object is equal to or greater than the first threshold value again. In this case, the object may be continually or intermittently displayed based on a user input.

As a determining result of operation S610, when the size of the region of the enlarged object is equal to or greater than the first threshold value, in operation S620, the device executes video application corresponding to the object.

In operation S630, the device displays a preview image of a video on the region of the enlarged object. The device may generate the preview image of the video to be reproduced by video reproducing application. Alternatively, the device may receive the preview image of the video to be reproduced by video reproducing application from a separate server (not shown). When the device receives the preview image from a server (not shown), the device may provide specification information about the device and an identification value of the video to be reproduced to a server (not shown) and may receive the preview image that is encoded in a format suitable for the performance of the device. In addition, as the object is enlarged, the device may gradually enlarge and display the preview image.

In operation S640, the device determines whether the size of the region of the enlarged object is equal to or greater than the second threshold value. The device may obtain the size of the region of the enlarged object, may compare the obtained size with the second threshold value, and may determine whether the size of the region of the enlarged object is equal to or greater than the second threshold value.

The second threshold value may be set according to the type of application corresponding to the object. Alternatively, the second threshold value may be set according to the number and size of components contained in an image indicating an executing result of application. However, the exemplary embodiment is not limited thereto.

As a determining result of operation S640, when the size of the region of the enlarged object is equal to or greater than the second threshold value, in operation S650, the device displays a reproduced image of the video on the region of the enlarged object. In operation S650, the device may reproduce an original file of the video and may display a reproduced image of the original file. In this case, a user interface (UI) for controlling reproduction of a video may be displayed together.

In addition, as a determining result of operation S640, when the size of the region of the enlarged object is equal to or smaller than the second threshold value, the device determines whether the size of the region of the enlarged object is equal to or greater than the second threshold value again. In this case, the object may be continually or intermittently enlarged based on a user input.

As the object is enlarged, the device may gradually enlarge and display the reproduced image of the video.

An example of a method of displaying a preview of a video and a reproduced image of the video will be described in detail with reference to FIG. 16.

Figure 7:
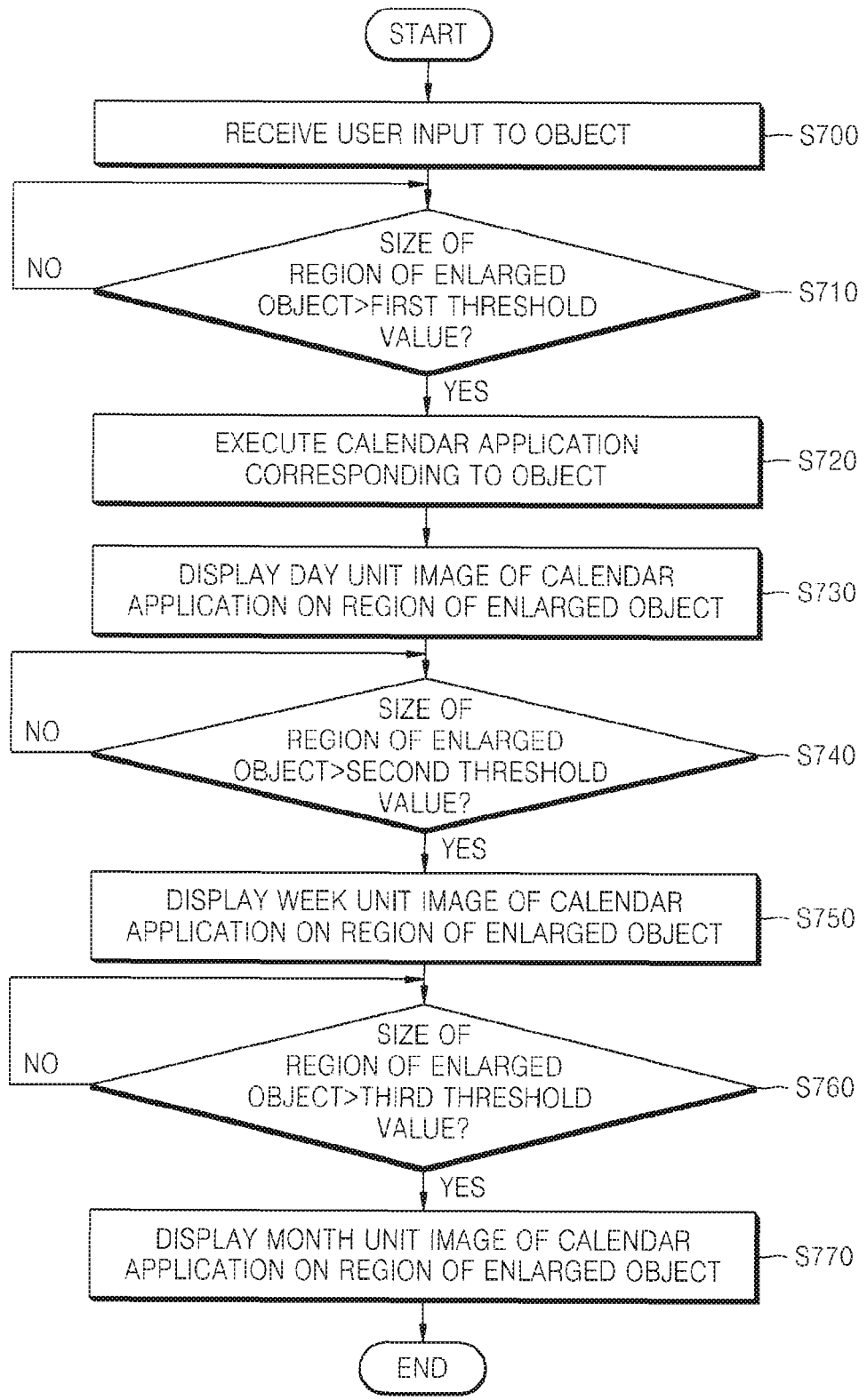
FIG. 7 is a detailed flowchart of a method of executing calendar application corresponding to an object and displaying an executing result, according to an exemplary embodiment.

FIG. 7 is a detailed flowchart of a method of executing calendar application corresponding to an object and displaying an executing result, according to an exemplary embodiment.

In operations S700 to S770 of FIG. 7, the object may be continually or intermittently enlarged based on a user input.

In operation S700, a device receives a user input to an object. In operation S700, the device may receive a user input performed by touching and dragging the object within a predetermined period of time. Alternatively, the device may receive a user input performed by touching and dragging an edge portion of the object. Alternatively, the device may receive a user input performed by pinching the object. However, a user input received by the device is not limited to these types.

In operation S710, the device determines whether the size of the region of the enlarged object is equal to or greater than a first threshold value. The device may obtain the size of the region of the enlarged object, may compare the obtained size with the first threshold value, and may determine whether the size of the region of the enlarged object is equal to or greater than the first threshold value.

As a determining result of operation S710, when the size of the region of the enlarged object is equal to or greater than the first threshold value, in operation S720, the device executes calendar application corresponding to the object. As a determining result of operation S710, when the size of the region of the enlarged object is equal to or smaller than the first threshold value, the device determines whether the size of the region of the enlarged object is equal to or greater than the first threshold value again. In this case, the object may be continually or intermittently displayed based on a user input.

In operation S730, the device displays a day unit image of the calendar application on the region of the enlarged object. The day unit image of the calendar application may contain a field for recording a predetermine date and a memo about a predetermine date. In addition, as the object is enlarged, the device may gradually enlarge and display the day unit image of the calendar application.

In operation S740, the device determines whether the size of the region of the enlarged object is equal to or greater than a second threshold value. The device may obtain the size of the region of the enlarged object, may compare the obtained size with the second threshold value, and may determine whether the size of the region of the enlarged object is equal to or greater than the second threshold value.

As a determining result of operation S740, when the size of the region of the enlarged object is equal to or greater than the second threshold value, in operation S750, the device displays a week unit image of the calendar application on the region of the enlarged object. The week unit image of the calendar application may contain a plurality of fields for recording dates included in a predetermined week and memos about the respective dates. In addition, as the object is enlarged, the device may gradually enlarge and display the week unit image of the calendar application.

As a determining result of operation S740, when the size of the region of the enlarged object is equal to or smaller than the second threshold value, the device determines whether the size of the region of the enlarged object is equal to or greater than the second threshold value again. In this case, the object may be continually or intermittently displayed based on a user input.

In operation S760, the device determines whether the size of the region of the enlarged object is equal to or greater than a third threshold value. The device may obtain the size of the region of the enlarged object, may compare the obtained size with the third threshold value, and may determine whether the size of the region of the enlarged object is equal to or greater than the third threshold value.

As a determining result of operation S760, when the size of the region of the enlarged object is equal to or greater than the second threshold value, in operation S770, the device displays a month unit image of the calendar application on the region of the enlarged object. The month unit image of the calendar application may contain a plurality of fields for recording dates included in a predetermined month and memos about the respective dates. In addition, as the object is enlarged, the device may gradually enlarge and display the month unit image of the calendar application.

As a determining result of operation S760, when the size of the region of the enlarged object is equal to or smaller than the third threshold value, the device determines whether the size of the region of the enlarged object is equal to or greater than the third threshold value again. In this case, the object may be continually or intermittently displayed based on a user input.

An example of a method of displaying calendar application on an region of the enlarged object will be described in detail with reference to FIG. 15.

Figure 8:
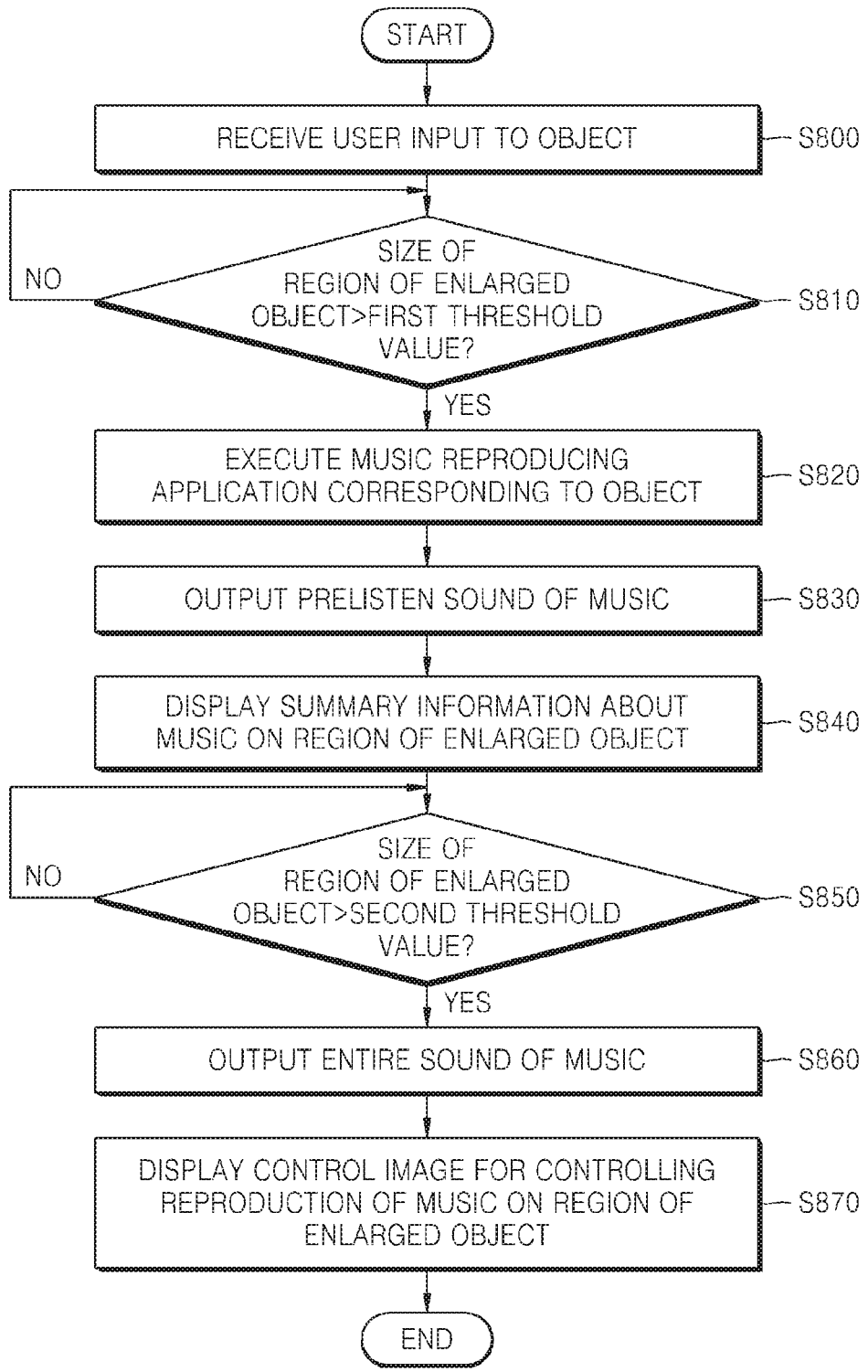
FIG. 8 is a detailed flowchart of a method of executing music reproducing application corresponding to an object and outputting an executing result, according to an exemplary embodiment.

FIG. 8 is a detailed flowchart of a method of executing music reproducing application corresponding to an object and outputting an executing result, according to an exemplary embodiment.

In operations S800 to S870 of FIG. 8, the object may be continually or intermittently enlarged based on a user input.

In operation S800, a device receives a user input to an object. In operation S800, the device may receive a user input performed by touching and dragging the object within a predetermined period of time. Alternatively, the device may receive a user input performed by touching and dragging an edge portion of the object. Alternatively, the device may receive a user input performed by pinching the object. However, a user input received by the device is not limited to these types.

In operation S810, the device determines whether the size of the region of the enlarged object is equal to or greater than a first threshold value. The device may obtain the size of the region of the enlarged object, may compare the obtained size with the first threshold value, and may determine whether the size of the region of the enlarged object is equal to or greater than the first threshold value.

As a determining result of operation S810, when the size of the region of the enlarged object is equal to or smaller than the first threshold value, the device determines whether the size of the region of the enlarged object is equal to or greater than the first threshold value again. In this case, the object may be continually or intermittently displayed based on a user input.

As a determining result of operation S810, when the size of the region of the enlarged object is equal to or greater than the first threshold value, in operation S820, the device executes the music reproducing application corresponding to the object.

In operation S830, the device outputs a prelisten sound of music. The prelisten sound is a sound for prelistening, and may be a portion of an entire sound of the music.

The device may generate the prelisten sound of the music to be reproduced by the music reproducing application. In addition, the device may receive the prelisten sound of the music to be reproduced by the music reproducing application from a separate server (not shown). When the device receives the prelisten sound from a separate server (not shown), the device may provide specification information about the device and an identification number of the music to be reproduced to a server (not shown) and may receive the prelisten sound that is encoded in a format suitable for the performance of the device.

In operation S840, the device displays summary information about the music on the region of the enlarged object. In operation S530, the device may generate the summary information about the music and may display the generated summary information on the region of the enlarged object.

In addition, the device may increase the amount of the displayed summary information as the object is enlarged.

In operation S850, the device determines whether the size of the region of the enlarged object is equal to or greater than the second threshold value. The device may obtain the size of the region of the enlarged object, may compare the obtained size with the second threshold value, and may determine whether the size of the region of the enlarged object is equal to or greater than the second threshold value.

As a determining result of operation S850, when the size of the region of the enlarged object is equal to or smaller than the second threshold value, the device determines whether the size of the region of the enlarged object is equal to or greater than the second threshold value again. In this case, the object may be continually or intermittently enlarged based on a user input.

In addition, as a determining result of operation S850, when the size of the region of the enlarged object is equal to or greater than the second threshold value, in operation S860, the device may output an entire sound of the music.

In operation S870, the device may display a control image for controlling reproduction of the music on the region of the enlarged object. The device may display a user interface (UI) for reproducing the music and detailed information about the music together. In addition, the device may gradually enlarge and display the control image of the music as the object is enlarged.

An example of a method of displaying an executing result of music reproducing application will be described in detail with reference to FIG. 17.

Figure 9:
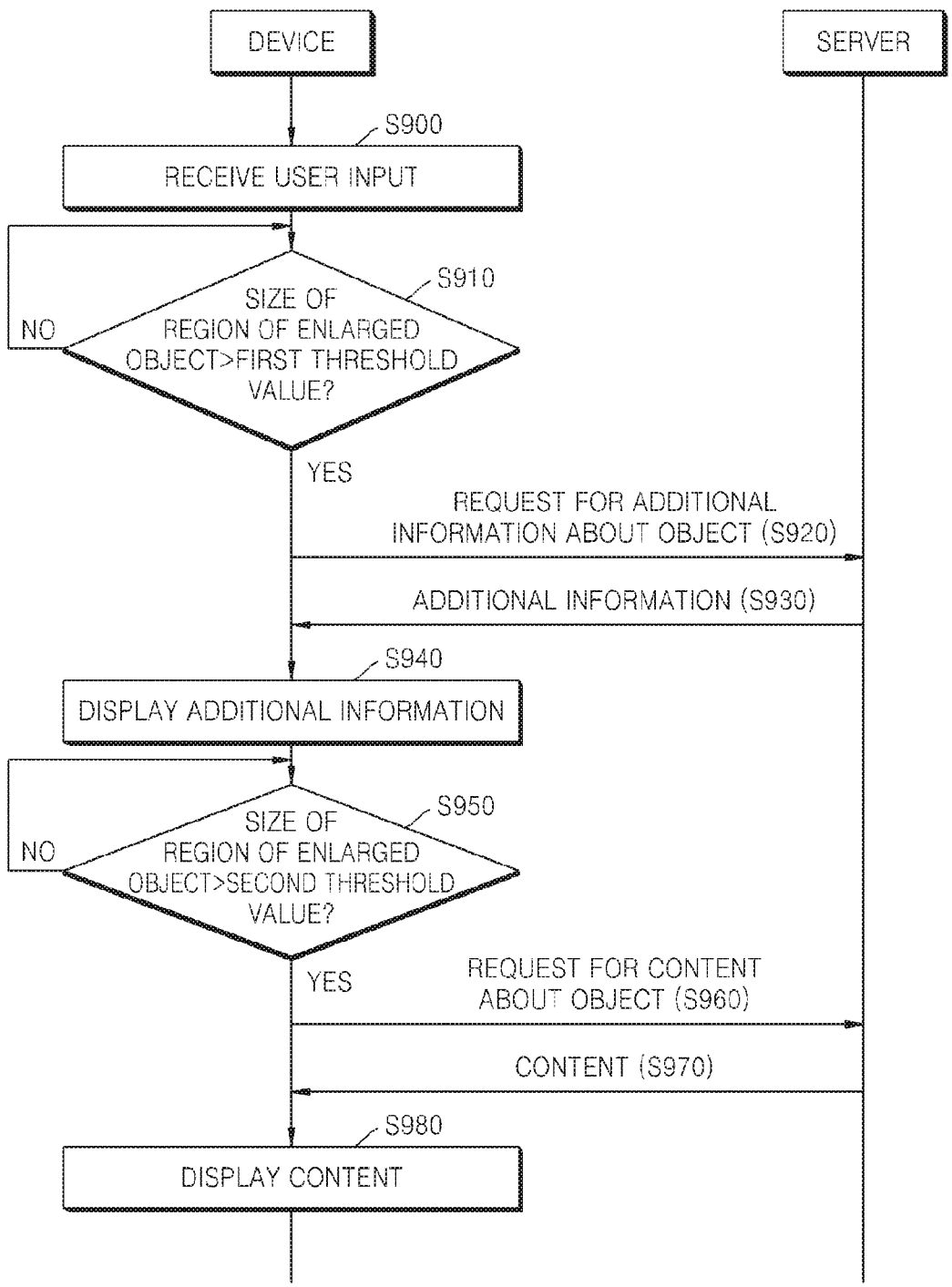
FIG. 9 is a flowchart of a method of receiving additional information of an object and content about the object from a server and displaying the information as the object is enlarged via a device, according to an exemplary embodiment.

FIG. 9 is a flowchart of a method of receiving additional information of an object and content about the object from a server and displaying the information as the object is enlarged via a device, according to an exemplary embodiment.

In operations S900 to S980 of FIG. 9, the object may be continually or intermittently enlarged based on a user input.

In operation S900, the device receives a user input to an object. In operation S900, the device may receive a user input performed by touching and dragging the object within a predetermined period of time. Alternatively, the device may receive a user input performed by touching and dragging an edge portion of the object. Alternatively, the device may receive a user input performed by pinching the object. However, a user input received by the device is not limited to these types.

In operation S910, the device determines whether the size of the region of the enlarged object is equal to or greater than a first threshold value. The device may obtain the size of the region of the enlarged object, may compare the obtained size with the first threshold value, and may determine whether the size of the region of the enlarged object is equal to or greater than the first threshold value.

As a determining result of operation S910, when the size of the region of the enlarged object is equal to or smaller than the first threshold value, the device determines whether the size of the region of the enlarged object is equal to or greater than the first threshold value again. In this case, the object may be continually or intermittently displayed based on a user input.

In addition, as a determining result of operation S910, when the size of the region of the enlarged object is equal to or greater than the first threshold value, in operation S920, the device request a server for additional information about the object. For example, when the object is an icon for executing a video, the device may request the server for the additional information about the video. The additional information about the video may include, for example, at least one of the type, title, amount, copywriter, a running time, and user evaluation of the video.

In operation S930, the device receives the requested additional information from the server. The server may obtain the additional information about the object and may provide the additional information to the device, in response to the request for the additional information. The server may collect the additional information from another server or may extract additional information from a database (DB) contained in the server.

In operation S940, the device displays the additional information on the region of the enlarged object. The additional information may be differentially displayed according to the size of the region of the enlarged object. For example, types of the additional information may be differentially displayed according to the size of the region of the enlarged object.

In operation S950, the device determines whether the size of the region of the enlarged object is equal to or greater than the second threshold value. The device may obtain the size of the region of the enlarged object, may compare the obtained size with the second threshold value, and may determine whether the size of the region of the enlarged object is equal to or greater than the second threshold value.

As a determining result of operation S950, when the size of the region of the enlarged object is equal to or smaller than the second threshold value, the device may determine whether the size of the region of the enlarged object is equal to or greater than the second threshold value again. In this case, the object may be continually or intermittently displayed based on a user input.

As a determining result of operation S950, when the size of the region of the enlarged object is equal to or greater than the second threshold value, in operation S960, the device may request the server for content about the object. For example, when the object is an icon for executing a video, the device may request the server for video content.

In operation S960, the device receives the requested content from the server. The server may obtain content about the object and may provide the content to the device. The server may collect the content from another server or may extract the content from a DB contained in the server. In addition, the content about the object may be provided to the device via a downloading method or a streaming method.

In operation S970, the device displays a reproduced image of the received content. The device may enlarge and display the reproduced image of the content as the region of the object is enlarged. However, the exemplary embodiment is not limited thereto.

In FIG. 9, for example, the content about the object may include, but is not limited to, a video, a still image, and a text.

Figure 10:
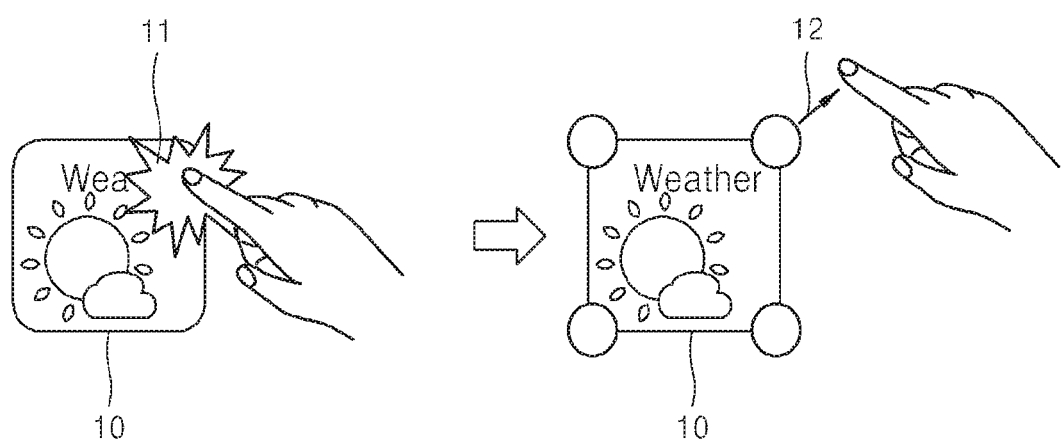
FIG. 10 is a diagram for explaining a user input for executing application corresponding to an object, according to an exemplary embodiment.

FIG. 10 is a diagram for explaining a user input for executing application corresponding to an object, according to an exemplary embodiment.

Referring to FIG. 10, when a user touches and drags (12) an edge portion 11 of a weather icon 10 that is an example of the object, a device may select a second execution mode from among a plurality of execution modes of the object. In addition, weather application corresponding to the weather icon 10 may be executed according to the second execution mode. In addition, as the weather icon 10 is enlarged, an executing result of the weather application may be gradually enlarged and displayed on an region of the enlarged object.

When a portion (for example, a portion of the object or some words contained in the object) of the weather icon 10 is touched and dragged, the device may select the second execution mode from among a plurality of execution modes.

Figure 11:
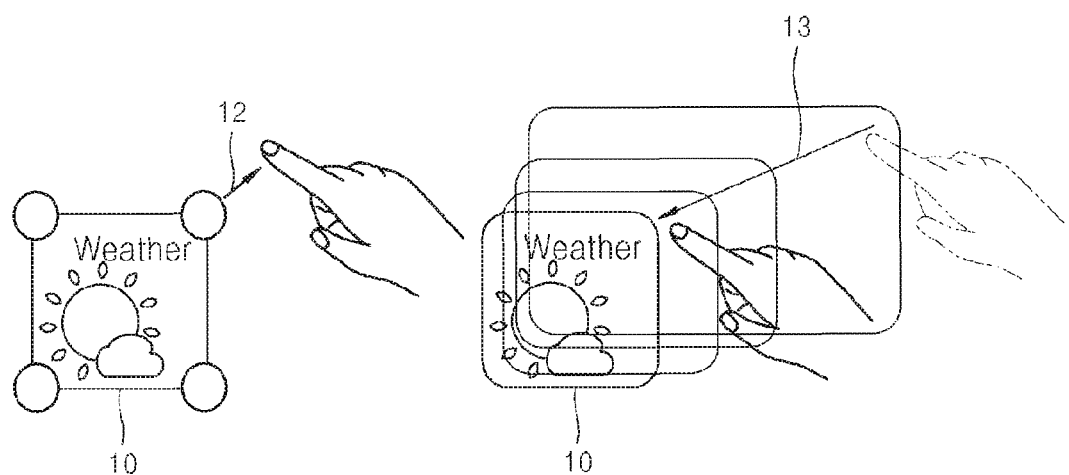
FIG. 11 is a diagram of a case where an enlarged object is reduced, according to an exemplary embodiment.

FIG. 11 is a diagram of a case where an enlarged object is reduced, according to an exemplary embodiment.

Referring to FIG. 11, after the weather icon 10 is touched and dragged (12), the device may receive an input performed by flicking (13) the weather icon 10 in an opposite direction to a direction in which the object is enlarged while the touch is maintained. Alternatively, as the device receives an input performed by touching, dragging, and flicking the object, the device may reduce the enlarged weather icon 10 to an original size. In this case, the device may terminate execution of the weather application corresponding to the weather icon 10.

In addition, as the weather icon 10 is touched and dragged (12) a region of the weather icon 10 may be enlarged. Further, the enlarged region of the weather icon 10 may be fixed according to a predetermined user input. when a portion of the enlarged region of the weather icon 10 is touched and dragged in an opposite direction to a direction in which the weather icon 10 is enlarged, the enlarged region of the weather icon 10 may be reduced.

Alternatively, as the weather icon 10 is touched and dragged (12), after a region of the weather icon 10 is enlarged and the region of the weather icon 10 is fixed according to a predetermined user input, when a portion (for example, a region of an icon for restoring the enlarged region) of the region of the weather icon 10 is touched, the enlarged region of the weather icon 10 may be reduced.

Alternatively, after the weather icon 10 is touched and dragged (12), as the touch is finished within a predetermined period of time, the enlarged region of the weather icon 10 may be reduced.

Figure 12:
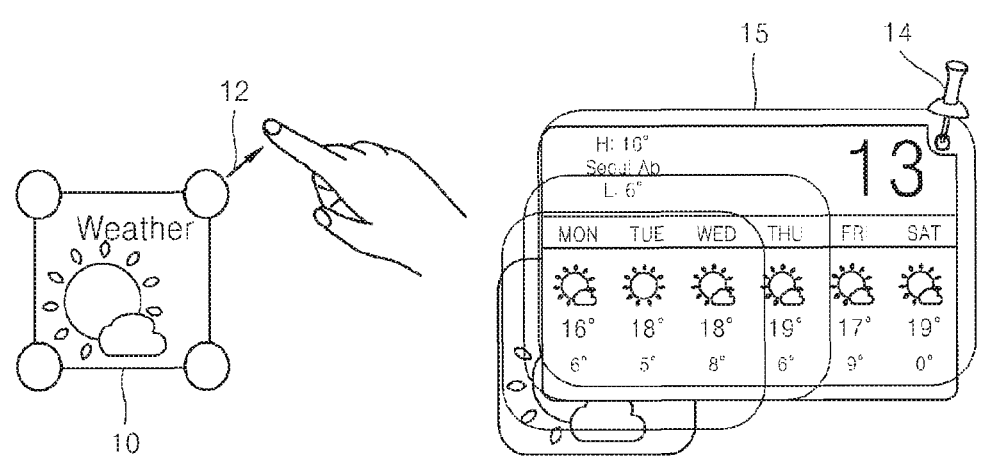
FIG. 12 is a diagram of a case where an object is fixed and displayed, according to an exemplary embodiment.

FIG. 12 is a diagram of a case where an object is fixed and displayed, according to an exemplary embodiment.

Referring to FIG. 12, after the weather icon 10 is touched and dragged (12), as the touch is maintained for a predetermined period of time or more, the device may fix the size of the enlarged region of the weather icon 10.

After the weather icon 10 is touched and dragged (12), when a pressure applied by touching a display is equal to or greater than a predetermined value, the device may fix the size of the enlarged region of the weather icon 10.

In addition, a predetermined icon 14 for indicating that the region of the weather icon 10 is fixed may be displayed on an upper right portion of the fixed region of the weather icon 10. When the size of the region of the weather icon 10 is fixed, an edge 15 of the region of the weather icon 10 colored with a predetermined color blinks a plurality of number of times. Alternatively, when the size of the region of the weather icon 10 is fixed, vibration of a predetermined pattern may be generated from the device. Alternatively, the device may output an effect obtained by combining two or more of a visual effect, an aural effect, and a tactile effect, which indicate that the size of the region of the weather icon 10 is fixed.

Alternatively, for example, after the object is touched and dragged, as a predetermined portion of the object is taped, the size of the enlarged object may be fixed. If the object is touched and dragged and then an icon having a pin shape is displayed at a corner of the object for a predetermined period of time, when the user taps the pin icon, the size of the enlarged object may be fixed. When the pin icon is not tapped within a predetermined period of time, the enlarged object may be reduced to an original size.

Alternatively, for example, after a user touches the object with two fingers and drags the objects with one finger of the two fingers, when the user drops the touch of the finger used for the dragging from the object and then touches the object with the finger again, the size of the object may be fixed.

Alternatively, for example, after a user touches the object with a finger, the user rubs the object with the finger, the size of the object may be fixed.

Alternatively, for example, after a user touches the object, the user rubs the object, when the user inputs a predetermined voice to the device, the size of the object may be fixed.

Figure 13:
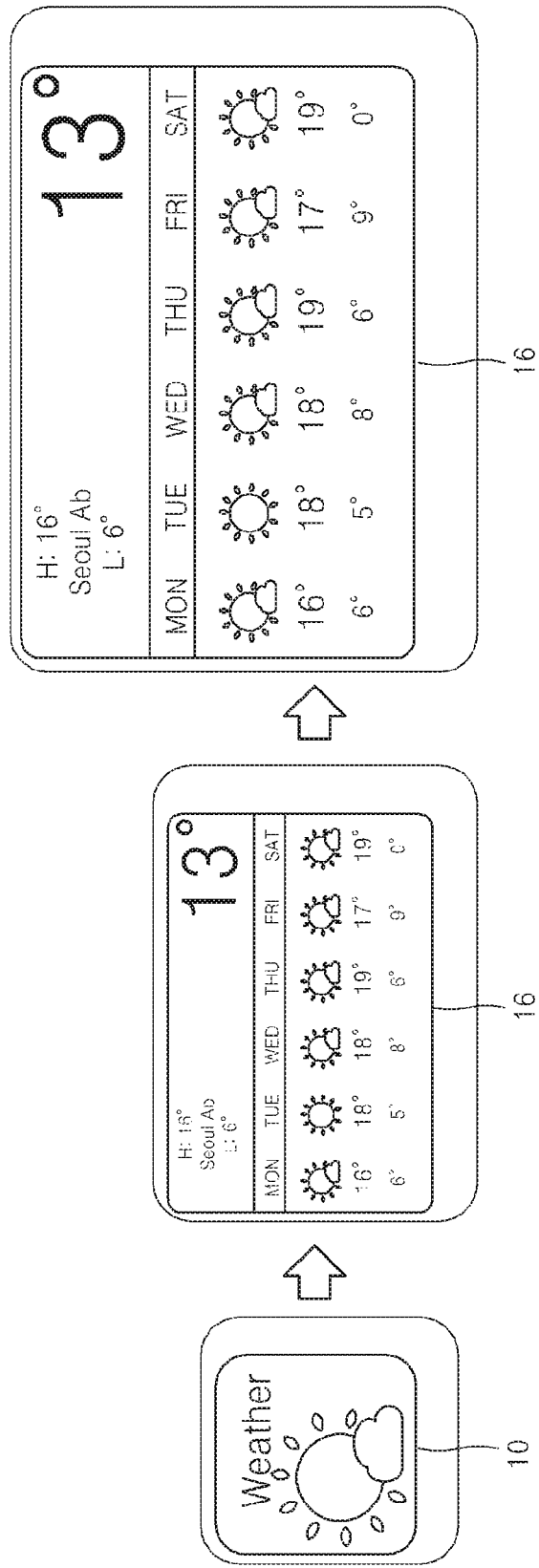
FIG. 13 is a diagram of a case where an executing result of application corresponding to an object is displayed as the object is gradually enlarged, according to an exemplary embodiment.

FIG. 13 is a diagram of a case where an executing result of application corresponding to an object is displayed as the object is gradually enlarged, according to an exemplary embodiment.

As shown in FIG. 13, as the weather icon 10 is enlarged, the weather icon 10 may not longer exist in the enlarged region of the weather icon 10 or may overlap the enlarged region of the weather icon 10 and an execution image 16 of weather application may be displayed. Alternatively, as the enlarged region is gradually enlarged, the execution image 16 of weather application may be gradually enlarged and displayed. Alternatively, the weather icon 10 may be displayed together with the execution image 16 of the weather application.

Figure 14:
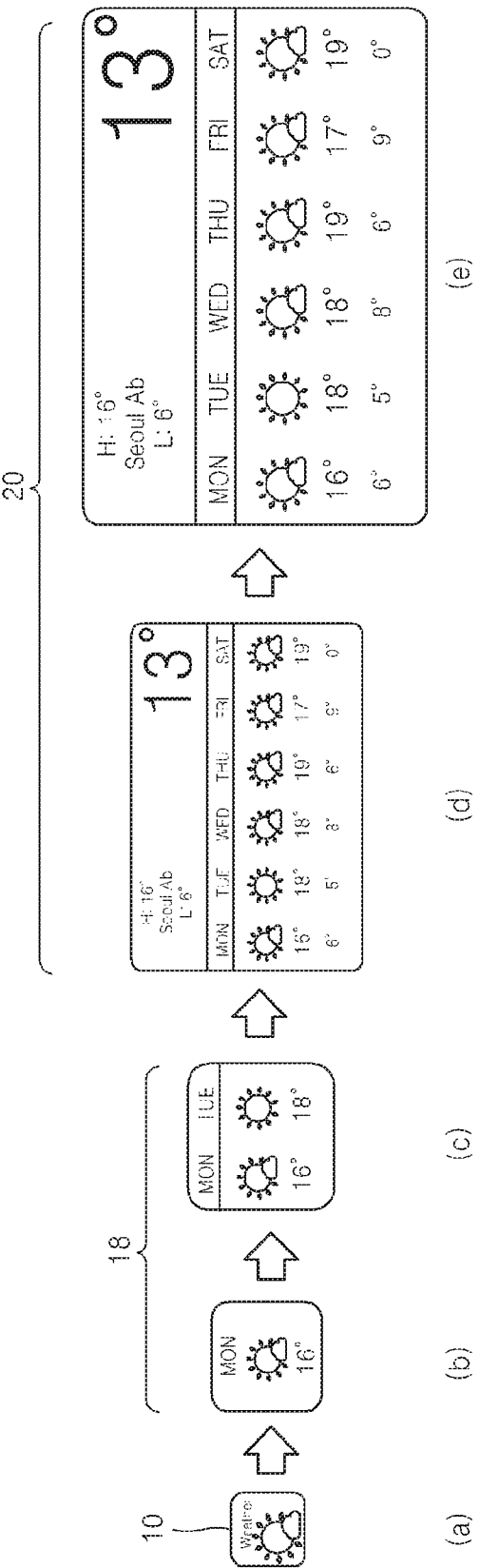
FIG. 14 is a diagram of a case where a portion or an entire portion of an execution image of application corresponding to an object is displayed on a screen as the object is gradually enlarged, according to another exemplary embodiment.

FIG. 14 is a diagram of a case where a portion 18 or an entire portion 16 of an execution image of application corresponding to an object is displayed on a screen as the object is gradually enlarged, according to another exemplary embodiment.

Referring to FIG. 14, as the weather icon 10 is gradually enlarged, the portion 18 or the entire portion 16 of the execution image of weather application may be displayed on the enlarged region of the weather icon 10. In detail, when the size of the enlarged region of the weather icon 10 is equal to or greater than a first threshold value and is equal to or smaller than a second threshold value, a portion of the execution image of the weather application may be gradually enlarged and displayed, as shown in FIGS. 14(b) and 14(c).

In addition, when the region of the enlarged region of the weather icon 10 is equal to or greater than the second threshold value, an entire portion of the execution image of the weather application may be gradually enlarged and displayed, as shown in FIGS. 14(c) and 14(d).

Alternatively, when the size of the enlarged region of the weather icon 10 is equal to or greater than the first threshold value and is equal to or smaller than the second threshold value, information about weather of a predetermined date may be displayed. When the size of the enlarged region of the weather icon 10 is equal to or greater than the second threshold value, information about weather of a predetermined week may be displayed. For example, when the weather application is executed on Monday and the size of the enlarged region of the weather icon 10 is equal to or greater than the first threshold value and is equal to or smaller than the second threshold value, weather information of Monday may be displayed. In addition, when the size of the enlarged region of the weather icon 10 is equal to or greater than the first threshold value and is equal to or smaller than the second threshold value, as the enlarged region of the weather icon 10 is enlarged, weather information of Monday and Tuesday may be displayed. In addition, when the size of the enlarged region of the weather icon 10 is equal to or greater than the second threshold value, weather information of Monday to Sunday may be displayed.

Figure 15:
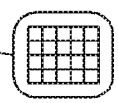
FIG. 15 is a diagram of a case where a calendar image is gradually changed and displayed as an object is enlarged when application corresponding to the object is calendar application, according to an exemplary embodiment.

FIG. 15 is a diagram of a case where a calendar image is gradually changed and displayed as an object is enlarged when application corresponding to the object is calendar application, according to an exemplary embodiment.

Referring to FIG. 15, as a calendar icon 30 is gradually enlarged, an executing result of the calendar application may be gradually displayed on the enlarged region of the calendar icon 30. In detail, when the size of the enlarged region of the calendar icon 30 is equal to or greater than the first threshold value and is equal to or smaller than the second threshold value, a day unit image 32 of the calendar application may be displayed, as shown in FIG. 15(b). In addition, when the size of the enlarged region of the calendar icon 30 is equal to or greater than the second threshold value and is equal to or smaller than the third threshold value, a week unit image 34 of the calendar application may be displayed, as shown in FIG. 15(c). In addition, when the size of the enlarged region of the calendar icon 30 is equal to or greater than the third threshold value, a month unit image 36 of the calendar application may be displayed, as shown in FIG. 15(d). In addition, as the enlarged region of the calendar icon 30 is enlarged, the day unit image 32, the week unit image 34, and the month unit image 36 of the calendar application may be gradually enlarged and displayed.

Figure 16:
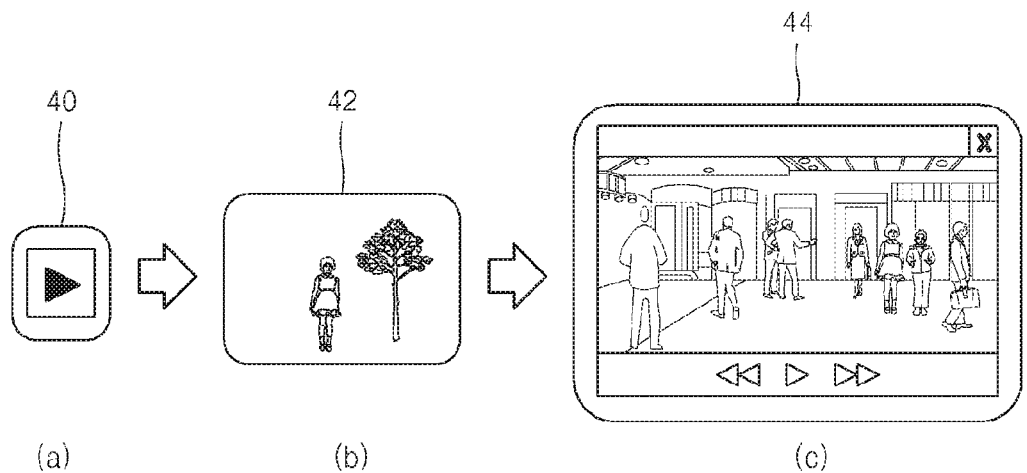
FIG. 16 is a diagram of a case where a preview image of a video and a reproduced image of the video are displayed as an object is enlarged when application corresponding to the object is video application, according to an exemplary embodiment.

FIG. 16 is a diagram of a case where a preview image 42 of a video and a reproduced image 44 of the video are displayed as an object is enlarged when application corresponding to the object is video application, according to an exemplary embodiment.

Referring to FIG. 16, as a video icon 40 is gradually enlarged, the preview image 42 of the video and the reproduced image 44 of the video may be gradually displayed on the enlarged region of the video icon 40. In detail, when the size of the enlarged region of the video icon 40 is equal to or greater than the first threshold value and is equal to or smaller than the second threshold value, the preview image 42 of the video may be displayed, as shown in FIG. 16(b). In addition, when the size of the enlarged region of the video icon 40 is equal to or greater than the second threshold value, the reproduced image 44 of the video may be displayed, as shown in FIG. 16(c). In addition, the reproduced image 44 of the video may contain a plurality of icons for controlling reproduction of the video.

Figure 17:
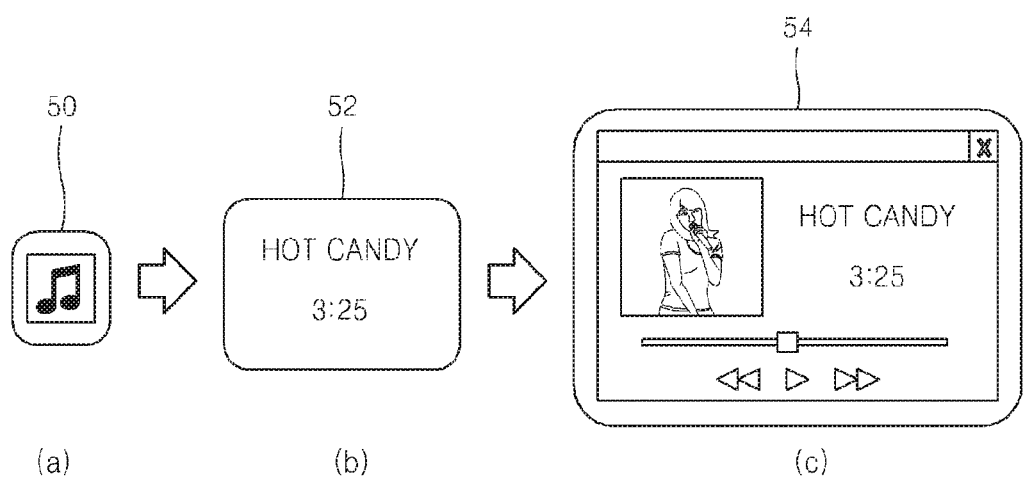
FIG. 17 is a diagram of a case where an executing result of application is gradually changed and displayed as an object is gradually enlarged when application corresponding to the object is music reproducing application, according to an exemplary embodiment.

FIG. 17 is a diagram of a case where an executing result of application is gradually changed and displayed as an object is gradually enlarged when application corresponding to the object is music reproducing application, according to an exemplary embodiment.

Referring to FIG. 17, as a music icon 50 is gradually enlarged, summary information 52 about the music and an image 54 for controlling reproduction of the music may be gradually displayed on the enlarged region of the music icon 50. In detail, when the size of the enlarged region of the music icon 50 is equal to or greater than the first threshold value and is equal to or smaller than the second threshold value, the summary information 52 about the music may be displayed, as shown in FIG. 17(b). In addition, simultaneously, a prelisten sound of the music may be output from the device.

In addition, when the size of the enlarged region of the music icon 50 is equal to or greater than the second threshold value, the image 54 for controlling reproduction of the music may be displayed, as shown in FIG. 17(c). In addition, simultaneously, a reproduced sound of the music may be output from the device.

Figure 18:
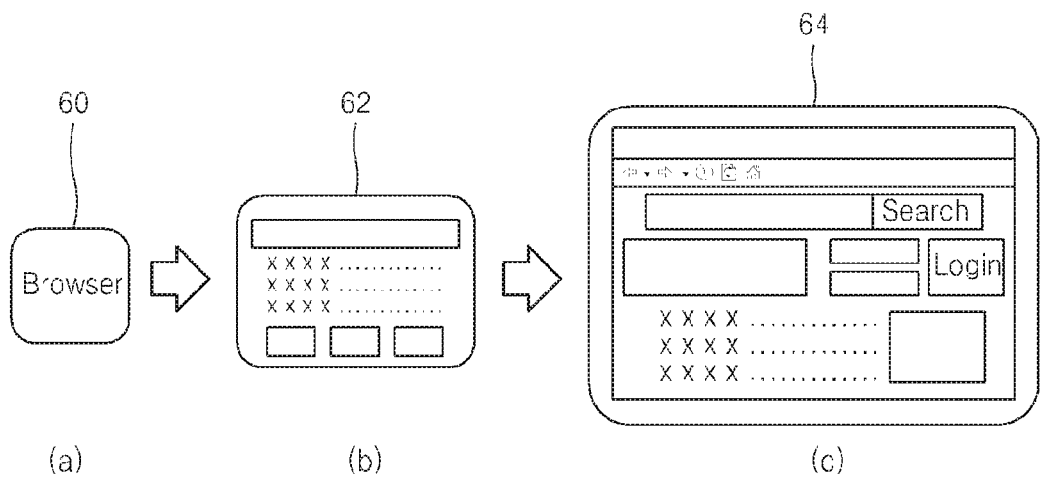
FIG. 18 is a diagram of a case where an executing result of application is gradually changed and displayed as an object is gradually enlarged when application corresponding to the object is Internet browser executing application, according to an exemplary embodiment.

FIG. 18 is a diagram of a case where an executing result of application is gradually changed and displayed as an object is gradually enlarged when application corresponding to the object is Internet browser executing application, according to an exemplary embodiment.

Referring to FIG. 18, as an Internet browser icon 60 is gradually displayed, a mobile browser 62 and a personal computer (PC) browser 64 may be gradually displayed on the enlarged region of the Internet browser icon 60. In detail, when the size of the enlarged region of the Internet browser icon 60 is equal to or greater than the first threshold value and is equal to or smaller than the second threshold value, the mobile browser 62 may be displayed, as shown in FIG. 18(b).

In addition, when the size of the enlarged region of the Internet browser icon 60 is equal to or greater than the second threshold value, the PC browser 64 may be displayed, as shown in FIG. 18(c).

Figure 19:
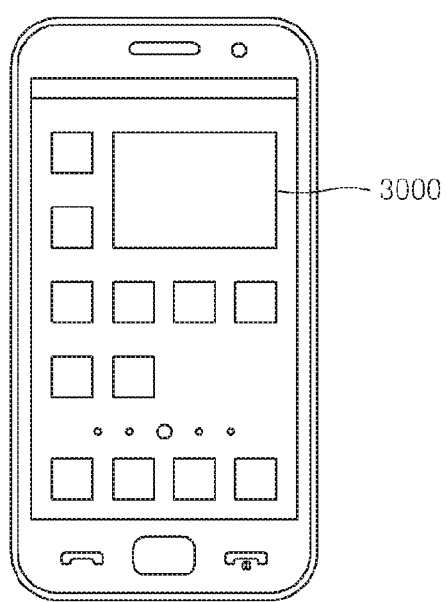
FIG. 19 is a diagram of a case where the positions and arrangements of objects other than an enlarged object are adjusted as the object is enlarged, according to an exemplary embodiment.

FIG. 19 is a diagram of a case where the positions and arrangements of objects other than an enlarged object 3000 are adjusted as the object 3000 is enlarged, according to an exemplary embodiment.

Referring to FIG. 19, when the object 3000 is enlarged, the positions and arrangements of the other objects other than the enlarged object 3000 may be changed such that the other objects other may not overlap the enlarged object 3000.

Figure 20:
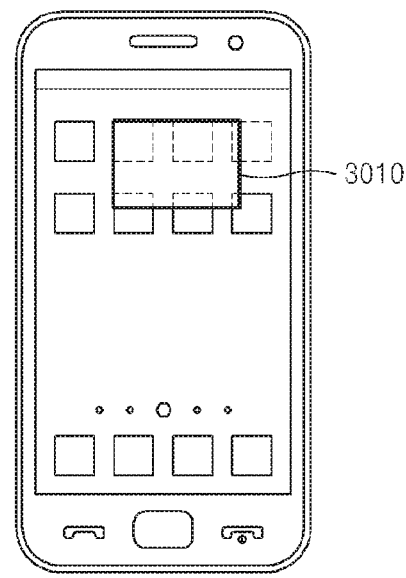
FIG. 20 is a diagram of a case where an enlarged image of which transparency is adjusted is displayed as the object is enlarged, according to an exemplary embodiment.

FIG. 20 is a diagram of a case where an enlarged image 3010 of which transparency is adjusted is displayed as the object 3010 is enlarged, according to an exemplary embodiment.

Referring to FIG. 20, when the object 3010 is enlarged, the enlarged object 3010 may overlap other objects. In addition, the transparency of the enlarged object 3010 may be adjusted and may be displayed to be translucent.

Figure 21:
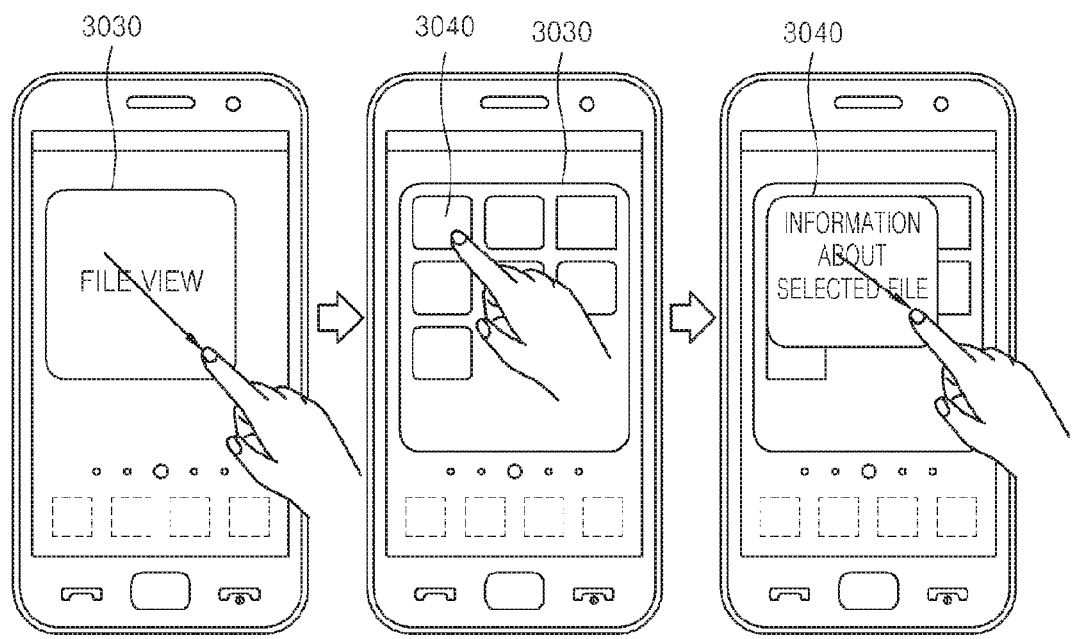
FIG. 21 is a diagram of a case where an object contained in an enlarged object is enlarged and displayed according to a user input, according to an exemplary embodiment.

FIG. 21 is a diagram of a case where an object contained in an enlarged object is enlarged and displayed according to a user input, according to an exemplary embodiment.

Referring to FIG. 21, as a first object on a screen of a device is enlarged, a plurality of objects related to the first object may be displayed on the enlarged region of the first object. Then, according to a predetermined user input, the enlarged region of the first object may be fixed. Then, when a second object is touched and dragged from among the plurality of objects, the second object may be enlarged.

For example, as an icon 3030 for viewing files stored in the device, another device, or a server is enlarged, the files stored in the device, another device, or the server may be displayed on the enlarged region of the icon 3030. In addition, as a file 3040 of the displayed files is enlarged, additional information about the file 3040 and an executing result of the file 3040 may be displayed on the enlarged region of the file 3040.

Figure 22:
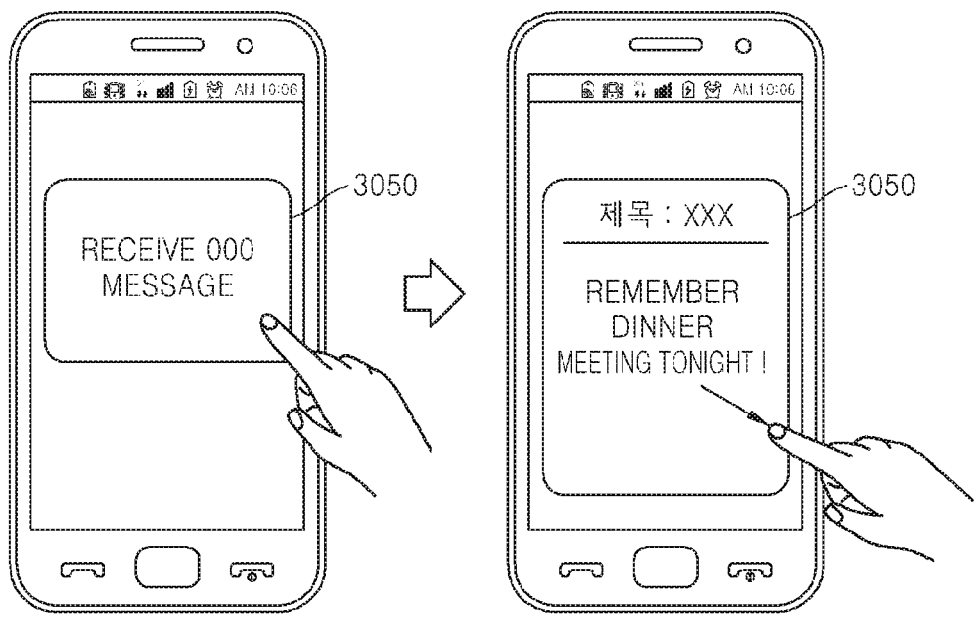
FIG. 22 is a diagram of a case where information about a message is displayed as a message notice window is enlarged, according to an exemplary embodiment.

FIG. 22 is a diagram of a case where information about a message is displayed as a message notice window 3050 is enlarged, according to an exemplary embodiment.

Referring to FIG. 22, when a device receives a message, the message notice window 3050 may be displayed on a screen of the device. In this case, summary information about the received message may be displayed on the message notice window 3050. For example, the phrase 'receive OOO message' may be displayed on the message notice window 3050.

Then, when the message notice window 3050 is enlarged according to a user input, detailed information of the message may be displayed on the enlarged region of the message notice window 3050. For example, the title and contents of the message may be displayed on the enlarged region of the message notice window 3050.

In addition, the message notice window 3050 may include a button for releasing locking of the device, which is displayed on at least one of the displayed image and wallpaper. However, the exemplary embodiment is not limited thereto.

Figure 23:
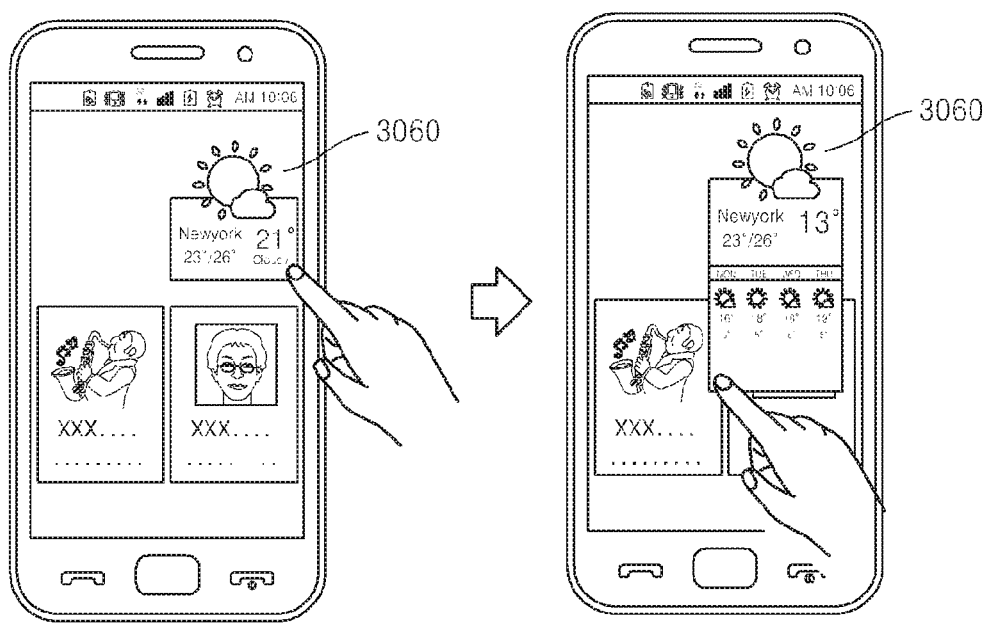
FIG. 23 is a diagram of a case where some of a plurality of widget windows are enlarged and displayed on a screen of a device, according to an exemplary embodiment.

FIG. 23 is a diagram of a case where some of a plurality of widget windows are enlarged and displayed on a screen of a device, according to an exemplary embodiment.

Referring to FIG. 23, a plurality of widget windows may be displayed on the screen of the device and one widget window 3060 from among the plurality of widget windows may be enlarged. The enlarged widget window 3060 may overlap other widget windows and may be displayed, and detailed information about content corresponding to the widget window 3060 may be displayed on the enlarged region of the widget window 3060.

Figure 24:
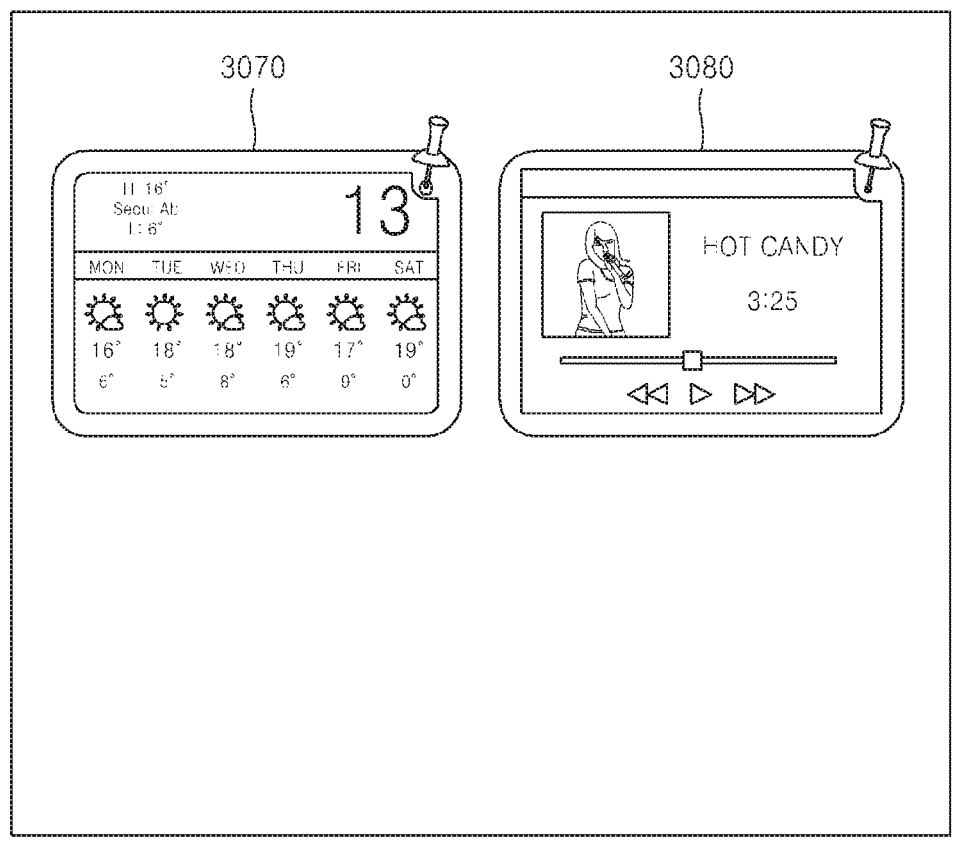
FIG. 24 is a diagram of a case where regions of a plurality of enlarged objects are fixed on a screen of a device, according to an exemplary embodiment.

FIG. 24 is a diagram of a case where regions of a plurality of enlarged objects are fixed on a screen of a device, according to an exemplary embodiment.

Referring to FIG. 24, a first object 3070 about weather may be enlarged, the enlarged region of the first object 3070 may be fixed, and weather information may be displayed on the fixed region of the first object 3070, on the screen of the device. In addition, a second object 3080 about a calendar may be enlarged, the enlarged region of the second object 3080 may be fixed, and calendar information may be displayed on the fixed region of the second object 3080, on the screen of the device. In addition, the enlarged region of the first object 3070 and the enlarged region of the second object 3080 may be displayed together on the screen of the device.

Figure 25:
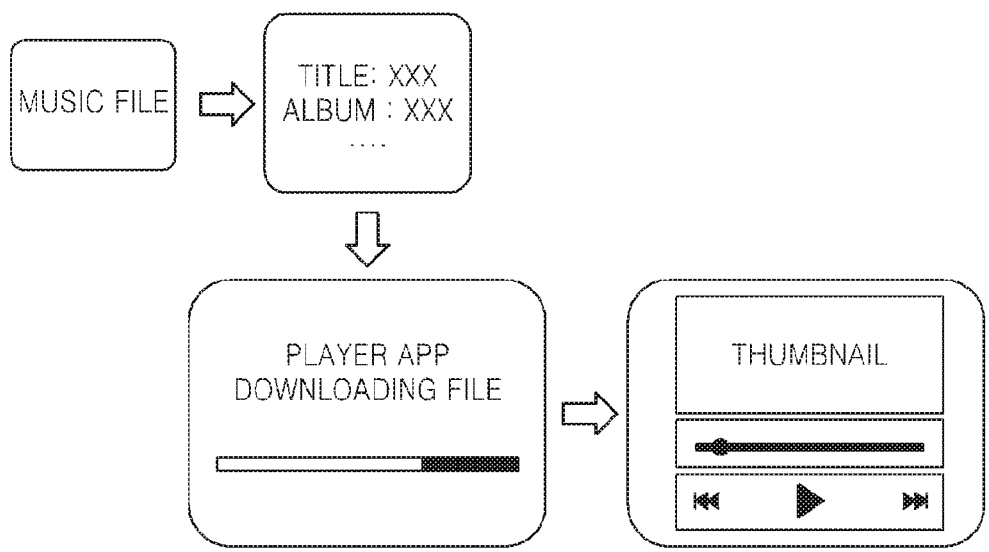
FIG. 25 is a diagram of a case where a device receives a music file from a server and displays information about the music file on an enlarged region of a music file icon, as the music file icon is enlarged, according to an exemplary embodiment.

FIG. 25 is a diagram of a case where a device receives a music file from a server and displays information about the music file on an enlarged region of a music file icon, as the music file icon is enlarged, according to an exemplary embodiment.

Referring to FIG. 25, as the music file icon music file icon is enlarged to be equal to or greater than the first threshold value, additional information about a music file may be displayed on the enlarged region of the music file icon. In this case, the device may receive the additional information about the music file from a server. However, the exemplary embodiment is not limited thereto.

Then, when the music file icon music file icon is enlarged to be equal to or greater than the second threshold value, the device downloads a music file from a server. In this case, information indicating a downloading degree of the music file may be displayed on the enlarged region of the music file icon.

Then, when the downloading is completed, an image for controlling the music file may be displayed on the enlarged region of the music file.

Figure 26:
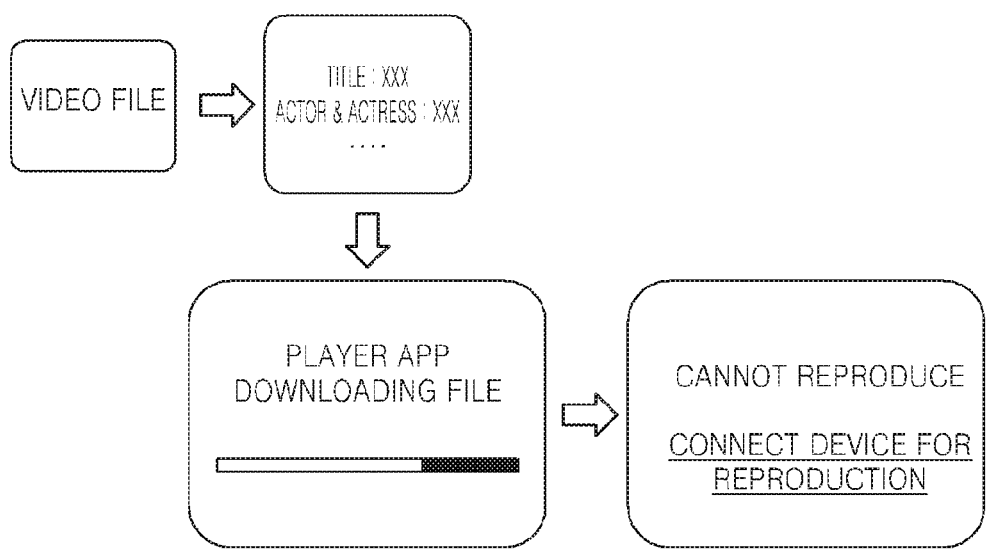
FIG. 26 is a diagram of a case where information about a video file is displayed on an enlarged region of a video file when a device cannot reproduce the video file, according to an exemplary embodiment.

FIG. 26 is a diagram of a case where information about a video file is displayed on an enlarged region of a video file when a device cannot reproduce the video file, according to an exemplary embodiment.

Referring to FIG. 26, as a video file icon is enlarged to be equal to or greater than the first threshold value, additional information about the video file may be displayed on the enlarged region of the video file. In this case, the device may receive the additional information about the video file from a server. However, the exemplary embodiment is not limited thereto.

Then, when a video file icon is enlarged to be equal to or greater than the second threshold value, the device downloads the video file from a server. In this case, information indicating a downloading degree of the video file may be displayed on the enlarged region of the video file.

Then, when the device cannot reproduce the downloaded video file, notice information indicating that the video cannot be reproduced may be displayed on the enlarged region of the video file. In addition, separate link information may be displayed such that the device may reproduce the video file. For example, when codec or application for reproducing the video file is not installed in the device, link information for downloading the code or the application may be displayed on the screen.

Figure 27:
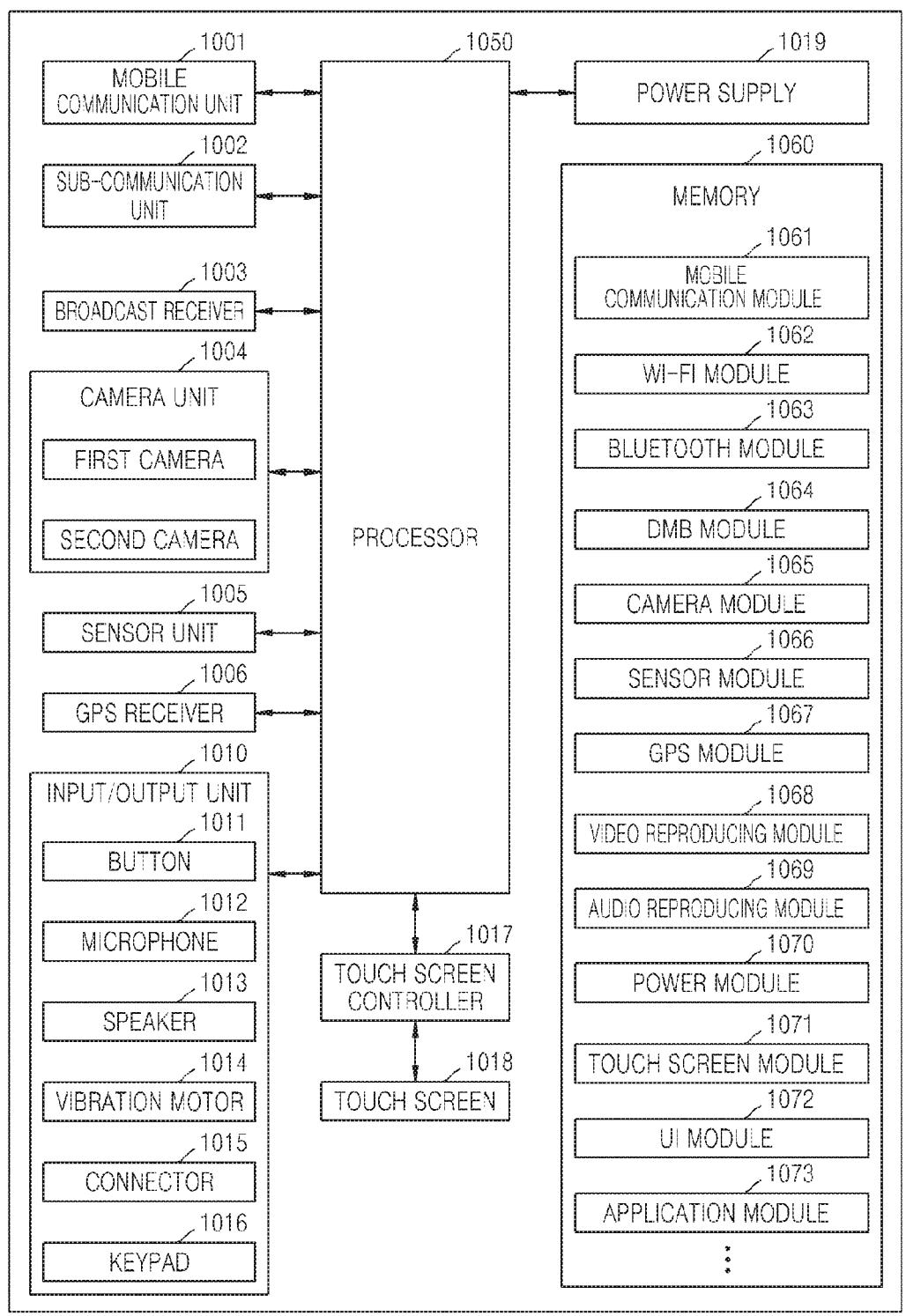
FIG. 27 is a diagram of a device for executing an object on a display, according to an exemplary embodiment.

FIG. 27 is a diagram of a device for executing an object on a display, according to an exemplary embodiment.

A mobile communication unit 1001 performs call set-up and data communication with a base station via a cellular network such as 3 generation/4 generation (3G/4G). A sub-communication unit 1002 performs functions for local communication such as Bluetooth or near field communication (NFC). A broadcast receiver 1003 receives digital multimedia broadcasting (DMB) signals.

A camera unit 1004 may include a lens and optical device for capturing a still image or video.

A sensor unit 1005 may include a gravity sensor for detecting a motion of the device, an illumination sensor for detecting brightness, a proximity sensor for detecting the proximity of a person, a motion sensor for detecting a motion of a person, and so on.

A global positioning system (GPS) receiver 1006 receives GPS signals from an artificial satellite. Various services may be provided to a user by using the GPS signals.

An input/output unit 1010 may provide an interface with an external device or the human and may include a button 1011, a microphone 1012, a speaker 1013, a vibration motor 1014, a connector 1015, and a keypad 1016.

A touch screen 1018 receives a user touch input. A touch screen controller 1017 transmits the user touch input received via the touch screen 1018 to a processor 1050. A power supply 1019 is connected to a battery or an external power source in order to supply power required for the device.

The processor 1050 executes programs stored in a memory 1060 so as to execute an object on a display and to display an executing result on a screen, according to an exemplary embodiment.

The programs stored in the memory 1060 may be divided into a plurality of modules according to their functions, and for example, may be divided into a mobile communication module 1061, a Wi-Fi module 1062, a Bluetooth module 1063, a DMB module 1062, a camera module 1065, a sensor module 1066, a GPS module 1067, a video reproducing module 1068, an audio reproducing module 1069, a power module 1070, a touch screen module 1071, a UI module 1072, an application module 1073, and so on.

For example, the mobile communication module 1061, the Wi-Fi module 1062, and the Bluetooth module 1063 may receive information about an object from another device or a server by using at least one of the mobile communication unit 1001, the sub-communication unit 1002, and the broadcast receiver 1003.

In addition, for example, the touch screen module 1071 may receive the user touch input via the screen of the device.

In addition, for example, the application module 1073 may determine the type of the user touch input and may determine whether the object is enlarged according to the user touch input. For example, the application module 1073 may determine whether the size of the region of the enlarged object is equal to or greater than a predetermined threshold value, the application module 1073 may determine information to be displayed on the region of the enlarged object.

In addition, for example, the application module 1073 may determine how a displayed image is processed as the object is enlarged.

In addition, for example, the UI module 1072 may enlarge and display the object on the screen of the device and may display predetermined information on the enlarged region of the object, based on the determination of the application module 1073. In addition, for example, the UI module 1072 may fix and display the enlarge region of the object or may reduce the enlarged region of the object, based on the determination of the application module 1073.

Functions of the aforementioned modules may be intuitively inferred by one of ordinary skill in the art based on their titles. The modules may correspond to combinations of commands for performing one or more functions that have been described with reference to FIGS. 1 through 18.

The commands do not need to be executed in separate programs, processes, or modules. The memory 1060 may contain further commands or a smaller number of commands than the commands. In addition, various functions of a device may be executed in software and/or hardware including at least one processor and/or application specific integrated circuit.

Throughout this specification, the one or more exemplary embodiments and all functional operations may be performed in a digital electronic circuit, or computer software, firmware, hardware, a combination of one or more thereof, which includes the aforementioned structures and equivalent structures thereof.

The computer readable medium may be any recording apparatus capable of storing data that is read by a computer system, e.g., a read-only memory (ROM), a random access memory (RAM), a compact disc (CD)-ROM, a magnetic tape, a floppy disk, an optical data storage device, and so on. The computer readable medium can be distributed among computer systems that are interconnected through a network, and the present invention may be stored and implemented as computer readable code in the distributed system.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of presenting visual display elements, by an electronic device, the method comprising:
    presenting a plurality of visual display elements on a touch screen of the electronic device, wherein the plurality of visual display elements are associated with a plurality of applications, one of the plurality of visual display elements provides first information representing an application associated with the one of the plurality of visual display elements, and presentations of the plurality of visual display elements are individually changeable;
    based on a first touch input for enabling a presentation of the one of the plurality of visual display elements to be changed, displaying a user interface element over a portion of the one of the plurality of visual display elements while another of the plurality of visual display elements is presented at a first position, wherein the first touch input comprises touching the one of the plurality of visual display elements for over a predetermined period of time; and
    based at least on a second touch input at the user interface element displayed over the portion of the one of the plurality of visual display elements:
        changing the presentation of the one of the plurality of visual display elements;
        replacing the first information with second information by presenting less than an entire portion of an image within the changed presentation of the one of the plurality of visual display elements; and
        presenting the other of the plurality of visual display elements at a second position.

2. The method of claim 1, wherein the portion of the one of the plurality of visual display elements comprises an edge portion or a corner portion of the one of the plurality of visual display elements.

3. The method of claim 1, further comprising presenting the changed presentation of the one the plurality of visual display elements and the other of the plurality of visual display elements together on the touch screen of the electronic device.

4. The method of claim 1, wherein the image comprises a first image, and
    the method further comprises, based at least on a third touch input at the user interface element displayed over the portion of the changed presentation of the one of the plurality of visual display elements, replacing the second information with third information by presenting less than an entire portion of a second image while the other of the plurality of visual display elements is presented on the touch screen of the electronic device.

5. The method of claim 4, wherein the first image and the second image are based on a same image.

6. The method of claim 1, wherein two of the plurality of visual display elements respectively correspond to two different applications.

7. The method of claim 1, wherein the replacing the first information with the second information comprises:
    obtaining a partial portion of the image from the entire portion of the image; and
    replacing the first information with the second information by presenting the obtained partial portion of the image within the changed presentation of the one of the plurality of visual display elements.

8. An electronic device comprising:
    a memory configured to store instructions; and
    a processor configured to execute the instructions to at least:
        control to present a plurality of visual display elements on a touch screen of the electronic device, wherein the plurality of visual display elements are associated with a plurality of applications, one of the plurality of visual display elements provides first information representing an application associated with the one of the plurality of visual display elements, and presentations of the plurality of visual display elements are individually changeable;
        based on a first touch input for enabling a presentation of the one of the plurality of visual display elements to be changed, control to display a user interface element over a portion of the one of the plurality of visual display elements while another of the plurality of visual display elements is presented at a first position, wherein the first touch input comprises touching the one of the plurality of visual display elements for over a predetermined period of time; and based at least on a second touch input at the user interface element displayed over the portion of the one of the plurality of visual display elements:
  control to change the presentation of the one of the plurality of visual display elements;
  control to replace the first information with second information by presenting less than an entire portion of an image within the changed presentation of the one of the plurality of visual display elements; and
  control to present the other of the plurality of visual display elements at a second position.

9. The electronic device of claim 8, wherein the portion of the one of the plurality of visual display elements comprises an edge portion or a corner portion of the one of the plurality of visual display elements.

10. The electronic device of claim 8, wherein the processor is further configured to execute the instructions to control to present the changed presentation of the one the plurality of visual display elements and the other of the plurality of visual display elements together on the touch screen of the electronic device.

11. The electronic device of claim 8, wherein the image comprises a first image, and
  the processor is further configured to execute the instructions to, based at least on a third touch input at the user interface element displayed over the portion of the changed presentation of the one of the plurality of visual display elements, control to replace the second information with third information by presenting less than an entire portion of a second image while the other of the plurality of visual display elements is presented on the touch screen of the electronic device.

12. The electronic device of claim 11, wherein the first image and the second image are based on a same image.

13. The electronic device of claim 8, wherein two of the plurality of visual display elements respectively correspond to two different applications.

14. The electronic device of claim 8, wherein the processor is further configured to execute the instructions to:
  control to obtain a partial portion of the image from the entire portion of the image; and
  control to replace the first information with the second information by presenting the obtained partial portion of the image within the changed presentation of the one of the plurality of visual display elements.

15. A non-transitory computer readable medium storing instructions executable by a processor of an electronic device to cause the processor to at least:
  control to present a plurality of visual display elements on a touch screen of the electronic device, wherein the plurality of visual display elements are associated with a plurality of applications, one of the plurality of visual display elements provides first information representing an application associated with the one of the plurality of visual display elements, and presentations of the plurality of visual display elements are individually changeable;
  based on a first touch input for enabling a presentation of the one of the plurality of visual display elements to be changed, control to display a user interface element over a portion of the one of the plurality of visual display elements while another of the plurality of visual display elements is presented at a first position, wherein the first touch input comprises touching the one of the plurality of visual display elements for over a predetermined period of time; and
  based at least on a second touch input at the user interface element displayed over the portion of the one of the plurality of visual display elements:
    control to change the presentation of the one of the plurality of visual display elements;
    control to replace the first information with second information by presenting less than an entire portion of an image within the changed presentation of the one of the plurality of visual display elements; and
    control to present the other of the plurality of visual display elements at a second position.

16. The non-transitory computer readable medium of claim 15, wherein the portion of the one of the plurality of visual display elements comprises an edge portion or a corner portion of the one of the plurality of visual display elements.

17. The non-transitory computer readable medium of claim 15, wherein the instructions executable by the processor of the electronic device further cause the processor to control to present the changed presentation of the one the plurality of visual display elements and the other of the plurality of visual display elements together on the touch screen of the electronic device.

18. The non-transitory computer readable medium of claim 15, wherein the image comprises a first image, and
  the instructions executable by the processor of the electronic device further cause the processor to, based at least on a third touch input at the user interface element displayed over the portion of the changed presentation of the one of the plurality of visual display elements, control to replace the second information with third information by presenting less than an entire portion of a second image while the other of the plurality of visual display elements is presented on the touch screen of the electronic device.

19. The non-transitory computer readable medium of claim 18, wherein the first image and the second image are based on a same image.

20. The non-transitory computer readable medium of claim 15, wherein two of the plurality of visual display elements respectively correspond to two different applications.

21. The non-transitory computer readable medium of claim 15, wherein the instructions executable by the processor of the electronic device further cause the processor to:
  control to obtain a partial portion of the image from the entire portion of the image; and
  control to replace the first information with the second information by presenting the obtained partial portion of the image within the changed presentation of the one of the plurality of visual display elements.

22. A method of providing a user interface in an electronic device, the method comprising:
  controlling to present a plurality of visual display elements on a touch screen of the electronic device, wherein the plurality of visual display elements are associated with a plurality of applications, one of the plurality of visual display elements provides first information representing an application associated with the one of the plurality of visual display elements, and presentations of the plurality of visual display elements are individually changeable;
  based on a first touch input for enabling a presentation of the one of the plurality of visual display elements to be changed, controlling to display a user interface element over a portion of the one of the plurality of visual display elements while another of the plurality of visual display elements is presented at a first position, wherein the first touch input comprises touching the one of the plurality of visual display elements for over a predetermined period of time; and based at least on a second touch input at the user interface element displayed over the portion of the one of the plurality of visual display elements:
- controlling to change the presentation of the one of the plurality of visual display elements;
- controlling to replace the first information with second information by presenting less than an entire portion of an image within the changed presentation of the one of the plurality of visual display elements; and
- controlling to present the other of the plurality of visual display elements at a second position.

23. The method of claim 22, wherein the portion of the one of the plurality of visual display elements comprises an edge portion or a corner portion of the one of the plurality of visual display elements.

24. The method of claim 22, further comprising controlling to present the changed presentation of the one the plurality of visual display elements and the other of the plurality of visual display elements together on the touch screen of the electronic device.

25. The method of claim 22, wherein the image comprises a first image, and the method further comprises, based at least on a third touch input at the user interface element displayed over the portion of the changed presentation of the one of the plurality of visual display elements, controlling to replace the second information with third information by presenting less than an entire portion of a second image while the other of the plurality of visual display elements is presented on the touch screen of the electronic device.

26. The method of claim 25, wherein the first image and the second image are based on a same image.

27. The method of claim 22, wherein two of the plurality of visual display elements respectively correspond to two different applications.

28. The method of claim 22, wherein the controlling to replace the first information with the second information comprises:
- controlling to obtain a partial portion of the image from the entire portion of the image; and
- controlling to replace the first information with the second information by presenting the obtained partial portion of the image within the changed presentation of the one of the plurality of visual display elements.

* * * * *